(12) United States Patent
Bapat et al.

(10) Patent No.: US 11,604,804 B2
(45) Date of Patent: Mar. 14, 2023

(54) DATA REPLICATION SYSTEM

(71) Applicant: GB Gas Holdings Limited, Windsor (GB)

(72) Inventors: Prasanna Bapat, Windsor (GB); Swapnil Shah, Windsor (GB)

(73) Assignee: GB GAS HOLDINGS LIMITED, Windsor (GB)

( * ) Notice: Subject to any disclaimer, the term of this patent is extended or adjusted under 35 U.S.C. 154(b) by 44 days.

(21) Appl. No.: 16/499,637

(22) PCT Filed: Mar. 23, 2018

(86) PCT No.: PCT/GB2018/050766
§ 371 (c)(1),
(2) Date: Sep. 30, 2019

(87) PCT Pub. No.: WO2018/178641
PCT Pub. Date: Oct. 4, 2018

(65) Prior Publication Data
US 2020/0117680 A1  Apr. 16, 2020

(30) Foreign Application Priority Data
Mar. 28, 2017 (GB) .................................... 1704973

(51) Int. Cl.
*G06F 16/00* (2019.01)
*G06F 16/27* (2019.01)
(Continued)

(52) U.S. Cl.
CPC ............. *G06F 16/27* (2019.01); *G06F 9/546* (2013.01); *G06F 16/1824* (2019.01); *G06F 16/2282* (2019.01); *G06F 16/2358* (2019.01)

(58) Field of Classification Search
CPC .. G06F 16/27; G06F 16/1824; G06F 16/2282; G06F 16/2358; G06F 9/546
See application file for complete search history.

(56) References Cited

U.S. PATENT DOCUMENTS 7,031,974 B1 * 4/2006 Subramaniam ......... G06F 16/27
2003/0182327 A1 * 9/2003 Ramanujam .......... G06F 16/273
(Continued)

OTHER PUBLICATIONS

PCT International Search Report from the International Application PCT/GB2018/050766, dated May 16, 2018, 2 pages.
(Continued)

*Primary Examiner* — Alexander Khong
(74) *Attorney, Agent, or Firm* — Tucker Ellis LLP; Michael G. Craig

(57) ABSTRACT

A data replication system is disclosed comprising a change event detection module configured to run at a first data repository and a change event implementation module configured to run at a second data repository. A messaging service configured to transmit received messages in accordance with message subscriptions is also provided. The event detection module is configured to detect changes made to the first data repository and transmit change event messages to the messaging service. The event implementation module is configured to subscribe to change event messages at the messaging service and, in response to receipt of a change event message, to implement the change event at the second data repository.

17 Claims, 15 Drawing Sheets

(51) Int. Cl.
  *G06F 16/182* (2019.01)
  *G06F 16/22* (2019.01)
  *G06F 16/23* (2019.01)
  *G06F 9/54* (2006.01)

(56) References Cited

U.S. PATENT DOCUMENTS

| | | | | |
|---|---|---|---|---|
| 2013/0024634 | A1* | 1/2013 | Shitomi | G06F 16/119 711/162 |
| 2013/0054524 | A1* | 2/2013 | Anglin | G06F 16/27 707/624 |
| 2014/0164327 | A1 | 6/2014 | Ngo et al. | |
| 2014/0310293 | A1 | 10/2014 | Knoll et al. | |
| 2016/0004720 | A1* | 1/2016 | Tabaaloute | G06F 16/128 707/639 |
| 2016/0019233 | A1* | 1/2016 | Wijayaratne | G06F 16/178 707/625 |
| 2016/0078088 | A1* | 3/2016 | Venkatesh | G06F 16/2453 707/713 |
| 2016/0197993 | A1* | 7/2016 | Perkowski | H04L 67/02 709/203 |
| 2017/0075965 | A1 | 3/2017 | Liu et al. | |
| 2017/0185647 | A1* | 6/2017 | Billington | G06F 16/9535 |
| 2018/0034824 | A1* | 2/2018 | Maycotte | G06F 21/6218 |
| 2019/0037016 | A1* | 1/2019 | Saito | G06F 12/16 |

OTHER PUBLICATIONS

Office Action from corresponding European Application No. 18715796.1, dated May 28, 2021, 7 pages.

Stage, Alexander, "Synchronization and replication in the context of mobile applications", pp. 1-16, XP002522573, Retrieved from the Internet:URL:http://www14.informatik.tu-muenchen.de/konferenzen/Jass05/courses/6/Papers/11.pdf, [retrieved on May 30, 2005].

Summons to attend oral proceedings pursuant to Rule 115(1) EPC from corresponding European Application No. 18715796.1, dated Aug. 1, 2022, 6 pages.

* cited by examiner

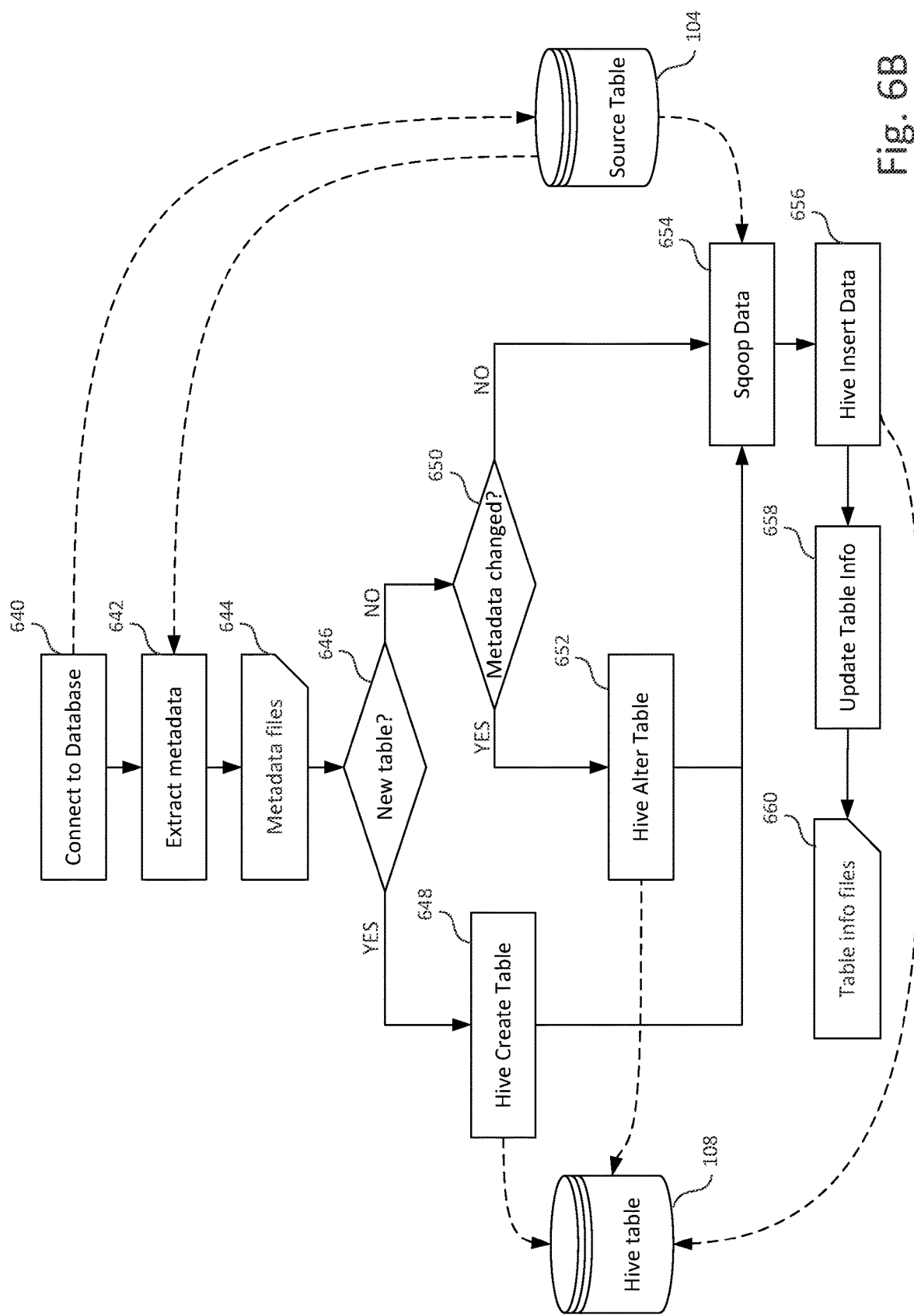

DATA REPLICATION SYSTEM

CROSS-REFERENCE TO RELATED APPLICATIONS

This application is a national phase application of International Application No PCT/GB2018/050766, filed Mar. 23, 2018, which claims priority to Great Britain Patent Application Serial No. 1704973.5, filed Mar. 28, 2017, all of which are incorporated herein by reference.

BACKGROUND

The present invention relates to systems and methods for replicating data between different data storage systems.

Organizations manage increasingly large volumes of data. Instead of relying on numerous individual conventional databases (e.g. relational databases), an alternative approach is to bring data together into large-scale data repositories, sometimes referred to as data warehouses or data lakes. There is often a need to maintain a copy of data from such a data warehouse in another location. This may be for the sake of data security and disaster recovery, but also to allow access by disparate systems (such as operational and analytics systems) without such systems disrupting each other's operations. However, the fairly freeform, unstructured approach to data storage adopted in many large-scale data warehouse solutions presents challenges when implementing data replication. The data volumes involved may also be very large and thus the data extraction and transfer process can impact the operation of either data store (which may be problematic especially if the source data supports operations of an organization with high transaction volumes). One common approach is to copy data in a relatively infrequent batch process, during quiet times (e.g. nightly). However, this means that the target data store (which may, for example, support analytics and reporting functions) will often not be fully up-to-date, only providing an approximate, historical view of the data at a particular point in time. Furthermore, existing data copying tools are generally limited in functionality and do not necessarily allow all required aspects of the source data store to be replicated efficiently to the target data store. For example, while the "distcp" distributed copy tool available on Apache Hadoop based storage clusters can be used to perform basic copying operations, this operates only at the file level and is thus more suited to scheduled batch copying operations than live data replication.

SUMMARY

The present invention seeks to alleviate some of the problems of known data replication approaches.

In a first aspect of the invention, there is provided a method of replicating changes made to a source data repository at a target data repository, the method comprising, at the target data repository: receiving a change event message comprising information specifying a data change event detected at the source data repository, the data change event comprising one or more data values being written to the source data repository; in response to the change event message, sending a request for the one or more data values to the source data repository; receiving the one or more data values from the source data repository; and updating data stored in the target data repository based on the received data value(s).

This approach allows the notification of changes that have been made in the source repository to be separated from the retrieval of modified data, improving efficiency and reliability. The one or more data values may comprise new data written to the source repository (e.g. rows inserted in a data table or data appended to a file), or may comprise modified data values replacing existing data values (e.g. row updates to a data table or data overwriting existing data in a file). The request may be a request specifically and only for the new/modified data values and/or only the new/modified data values may be transmitted/received in response (e.g. specific field values in a modified row). Alternatively, a larger unit of data including the new/modified data values may be requested and/or may be transmitted/received in response to the request. For example, for a row insert or row update, the whole row may be requested/transmitted, or a whole file containing table data including the new/modified data values (e.g. containing multiple table rows) may be requested/transmitted. For file updates, the whole file, or a relevant portion thereof, may be requested/transmitted.

The message preferably specifies an operation performed at the source data repository. The operation may comprise one of an insert or update operation (e.g. for inserting or updating one or more rows in a data table). The operation may also comprise a file creation/update/append operation.

Preferably, the message does not include the one or more data values. Thus, the message may specify the type of operation performed and/or identify modified data without including the modified data. Preferably, the message includes identifying information allowing the one or more data values to be identified, the request including the identifying information (e.g. row or file identifiers).

The message is preferably received via a messaging service. Such a messaging service is preferably arranged to receiving messages from one or more message sources and deliver received message to one or more message destinations, where the message destinations have registered an interest (i.e. subscribed) to the messages. Thus, the method may comprise subscribing, by the target data repository, to change event messages from the messaging service.

Preferably, the method comprises at the source data repository: detecting the change event; and outputting the change event message based on the detected change event. The outputting step may comprise sending the change event message to the messaging service.

Detecting the change event preferably comprises monitoring or inspecting a change log associated with the source data repository. The change log is preferably a data structure that records changes made to the source data repository (e.g. a HDFS edit log or Hive notification table as discussed further below). The inspecting is preferably performed periodically (e.g. at a configurable frequency), or in response to a trigger.

The updating step preferably comprises modifying data at the target repository to replicate the change event at the target repository. Replication may involve modifying the target repository in the same way as the source repository (e.g. by storing the new or modified data values in a corresponding table, file or other data structure at the target repository). Alternatively or additionally, additional processing may be performed, e.g. to preprocess or modify received data values prior to storing in the target repository.

The steps of sending a request and receiving the one or more data values may comprise transmitting a file comprising the one or more data values from the source data repository to the target data repository. The data change event may comprise creation or modification of a file at the source repository, in which case the receiving step may comprise receiving a copy of the created or modified file from the source repository. The data change event may comprise insertion or update of one or more rows in a database table, and preferably wherein the receiving step comprises receiving the one or more rows or receiving a copy of one or more files storing inserted or updated data (e.g. rows or columns) of the database table.

In a further aspect of the invention (which may be combined with the above aspect), there is provided a method of replicating changes made to a source data repository at a target data repository, the method comprising, at the target data repository: receiving change event messages comprising information specifying data change events detected at the source data repository; and updating the target data repository in dependence on the change event messages; wherein the data change events comprise data content changes and data structure changes, the method comprising: in response to a change event message specifying a data content change, updating data in the target data repository based on the change event message; and in response to a change event message specifying a data structure change, implementing the data structure change at the target data repository.

In this way, both data content changes and data structure changes can be replicated via a common mechanism. Data content changes may include data being added to, updated in, and/or deleted from the source repository. For data stored in data tables, this may involve addition of one or more rows to a table, updating of one or more rows or deletion of one or more rows. For data stored in files, this may involve writing or appending to a data file. Data structure changes may comprise model changes (e.g. by way of changes to metadata defining the data model). For data stored in data tables, this may involve addition of a column to or deletion of a column from a table, a change in a column definition (e.g. data type, length etc.), creation or deletion of a table, view or partition, an indexing change, or the like.

Thus, where the change event message specifies a change in a table definition at the source repository, implementing the data structure change may comprise modifying a table definition in the target repository to apply a corresponding change to a table of the target repository. Where the change event message specifies creation or deletion of a table at the source repository, implementing the data structure change may comprise creating or deleting a corresponding table at the target data repository.

On the other hand, in response to a change event message specifying a data content change, a corresponding data change may be applied at the target data repository. This preferably involves performing a method as set out above (e.g. in accordance with the first aspect of the invention).

In a further aspect, which may be combined with any of the above aspects, the invention provides a method of replicating changes made to a source data repository at a target data repository, the method comprising, at the target data repository: receiving a change event message comprising information specifying a data change event detected at the source data repository; determining, based on the change event message, that the data change event comprises new or updated data being written to the source data repository, the new or updated data not included in the change event message; in response to the determination, retrieving the new or updated data from the source data repository; and updating data stored in the target data repository based on the retrieved data and the change event message.

The method in accordance with this aspects may comprising any of the further steps or features of any of the previously described aspects.

The following features may additionally be provided with any of the above aspects.

The source and/or target data repository may comprise an unstructured or flexibly structured data repository, such as a data warehouse or data lake. Preferably, at least one (optionally both) of the source and target data repositories comprises a distributed data storage cluster, preferably based on Apache Hadoop and/or Apache Hive.

Where the source repository is implemented using an Apache Hive or similar data abstraction layer, the method may comprise replicating a Hive metadata change, wherein the change event message relates to creation of a Hive table or modification of a Hive table definition, the updating step preferably comprising applying a corresponding change to data structures (e.g. a corresponding Hive table) at the target data repository. Alternatively or additionally, the method may comprise replicating a Hive table data change, wherein the change event message relates to insertion, deletion or update of one or more rows in a Hive table, the updating step comprising applying a corresponding change to a Hive table in the target repository based on the received data values.

In a further aspect, the invention provides a system having means for performing any method as set out herein. The invention also provides a computer-readable medium comprising software code adapted, when executed on a data processing apparatus, to perform any method as set out herein.

In a further aspect of the invention, there is provided a data replication system comprising: a change event detection subsystem configured to run at a source data repository; a change event implementation subsystem configured to run at a target data repository; and a messaging service configured to transmit received messages in accordance with message subscriptions; wherein the change event detection subsystem is configured to detect changes made to the source data repository and transmit change event messages to the messaging service; and wherein the change event implementation subsystem is configured to: subscribe to change event messages at the messaging service; and in response to receipt of a change event message, to implement the change event at the target data repository.

Use of a messaging service or system can allow for efficient, flexible and dynamically configurable transmission of replication information, allowing a variety of replication scenarios to be implemented efficiently.

For example, the system may comprise a plurality of target data repositories each comprising respective change event implementation subsystems, each change event implementation subsystem adapted to subscribe to change event messages from the source data repository and implement corresponding change events at the respective target data repository.

Alternatively or additionally, the system may comprise a plurality of source data repositories each comprising a respective change event detection subsystem adapted to transmit change event messages to the messaging service corresponding to change events at the respective source data repository. Change event messages from the plurality of source data repositories are preferably forwarded by the messaging service to at least one target data repository for replication of the change events at the at least one target data repository.

The change event implementation subsystem may be configured to filter received messages and/or replicate a selected subset of change events at the target repository. The change event implementation subsystem may adapted, in response to receipt of a change event message corresponding to new or modified data being written to the source data repository, to retrieve at least a portion (or all) of the new or modified data from the source data repository, preferably wherein the at least a portion of the new or modified data is not included in the change event message. Thus, while change events may be pushed to the target repository via the messaging service, data content (e.g. new/modified data values) may be pulled from the source repository by the implementation subsystem at the target repository responsive to the change events.

The data replication system is preferably adapted to perform any method as set out herein (e.g. in accordance with any of the previously described aspects of the invention).

The term "row" as used herein, generally refers to a unit of data stored in a data table, typically comprising one or more field values (where fields correspond to columns of the table) that together form an entry of the table. A row may also be referred to as a record (having fields) or data object (having attributes). Note that in column-based data stores, data may be stored and processed on a column-by-column basis, and thus any mechanism discussed herein involving transmission of rows (e.g. for replication of data changes) may be adapted to transmit instead columns (or parts thereof, e.g. column partitions) of data. The terms "row" and "column" may thus be used interchangeably unless required otherwise by context.

More generally, the invention also provides a system or apparatus having means, preferably in the form of a processor with associated memory, for performing any method as set out herein, and a tangible/non-transitory computer-readable medium comprising software code adapted, when executed on a data processing apparatus, to perform any method as set out herein.

Any feature in one aspect of the invention may be applied to other aspects of the invention, in any appropriate combination. In particular, method aspects may be applied to apparatus and computer program aspects, and vice versa.

Furthermore, features implemented in hardware may generally be implemented in software, and vice versa. Any reference to software and hardware features herein should be construed accordingly.

BRIEF DESCRIPTION OF THE DRAWINGS

Preferred features of the present invention will now be described, purely by way of example, with reference to the accompanying drawings, in which:—

FIG. 6B illustrates a process for managing data schemas during import;

DETAILED DESCRIPTION

Figure 1:
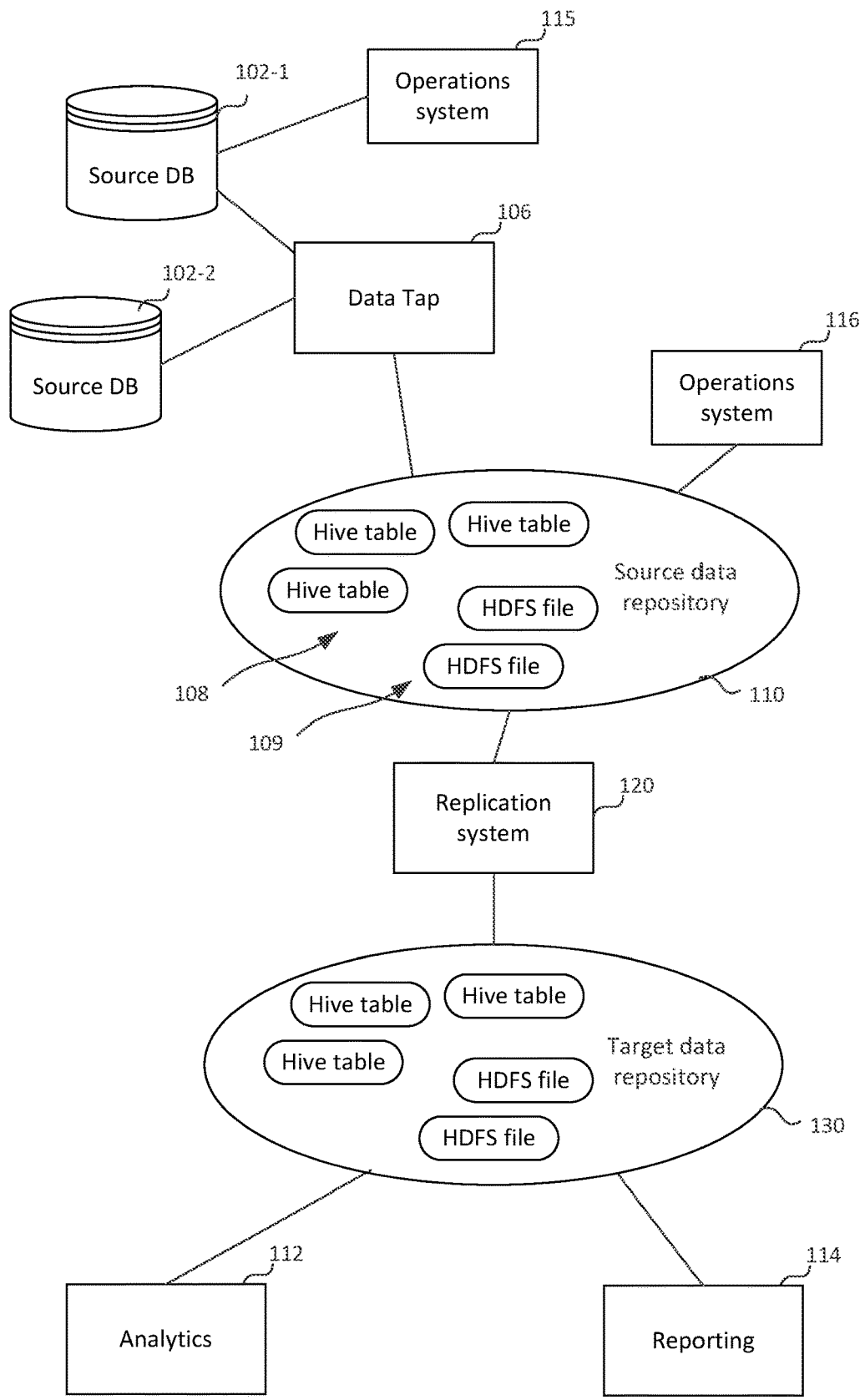
FIG. 1 illustrates a data replication system in overview.

Embodiments of the invention provide systems and methods for replicating data between large-scale scale unstructured or flexibly structured data repositories. Such a data replication system is illustrated in overview in FIG. 1.

It should be noted that, in the following description, specific implementation details are set out by way of example (for example in relation to database and software technologies used and details of the software architecture of the system—e.g. the use of Hadoop/Hive and Java technologies). These relate to an exemplary implementation of the system but should not be construed as limiting, and alternative approaches and technologies may be substituted.

The data replication system comprises a source data repository 110, a target data repository 130 and a replication system 120.

The data repositories 110, 130 are typically large data repositories of a type often referred to as "data lakes" or "data warehouses", and may comprise any data storage technology. Preferably, the data repositories allow data to be stored in an unstructured or flexibly structured manner. For example, such a repository may not require a fixed or pre-defined data schema. Each repository may be (or may include) a NoSQL or other non-relational database, such as a document-oriented database storing data as "document" data objects (e.g. JSON documents), a key-value store, a column-oriented database, a file system storing flat files, or any other suitable data store or combination of any of the above. However, in other embodiments, a data repository could alternatively include a conventional structured database such as a relational database or object database. The repositories 110 and 130 could be based on the same underlying storage technologies or may use different storage technologies and may structure data in the same or in different ways.

In the examples described herein, each of the repositories is implemented as a Hadoop data repository employing a Hadoop Distributed File System (HDFS) with an Apache Hive data warehousing infrastructure. Data may be stored in the repository in various forms, including:

Structured data may be stored as a set of Hive tables 108 managed by the Hive subsystem. Hive provides a table-like abstraction for data stored in the HDFS, in which the table data is stored within files in the HDFS, whilst metadata describing the Hive tables is stored in a metadata database called the Hive Metastore. Hive Query Language (HQL) is used to create and manipulate Hive tables.

Other data may be stored as simple files 109 in the HDFS.

In the present example, the source data repository 110 may be considered a main or operational repository, containing live data used, e.g., to support operations of an organization (for example in operations system 116). The target repository 130 may be considered a backup repository which may be used as a backup, and/or to support secondary functions (e.g. data analytics and/or reporting). Note that this distinction is provided by way of example, and the repositories may support other purposes and functions.

In the present example, data in the source repository 110 may be supplied directly by operations system 116. Alternatively or additionally, data may originate from any number of source databases (e.g. 102-1, 102-2). Unlike the data repository 110, these may be conventionally structured databases (e.g. relational or object databases) but any form of data source may be used, such as flat files, real-time data feeds, and the like. In the following examples, the source databases 102 are relational databases managed by conventional relational database management systems (RDBMS), e.g. Oracle/MySQL/Microsoft SQL Server or the like. The source databases may, for example, include legacy databases, external databases (e.g. from third-party data providers), or databases that support operations systems (e.g. system 115) that rely on conventional database architectures and are not able to interface directly with the data repository 110.

A Data Tap tool 106 allows for import of such data sources into the source data repository 110. Assuming the source databases are conventional relational databases or similar, then a given source database 102 consists of a number of tables (where a table comprises a set of rows or records, each divided into one or more fields or columns). The Data Tap tool may import a database in its entirety (i.e. including all tables) or alternatively may import only one or more selected tables. Furthermore, the system may import tables and data from a single data source or from multiple data sources into the same data repository 110. Thus, data that originated from differently structured data sources having different original data schemas may coexist within source data repository 110.

In the source repository 110, structured data (whether supplied/manipulated directly e.g. via operations system 116 or imported via Data Tap tool 106) is stored as a collection of Hive tables 108. The Hive tables are embodied in in one or more files in the HDFS (e.g. in Hadoop SEQUENCEFILE format). In practice, except possibly for very small Hive tables which can be stored in a single file, a given table may be split across multiple files in the HDFS.

When importing from source databases 102, the Data Tap tool preferably operates in a parallelized fashion as a map-reduce algorithm (here implemented using the Hadoop Java map-reduce framework) and the number of files produced for an imported table depends on how many mappers are used to create the files. As an example, for small tables a default of ten mappers may be used producing ten files for a table, but very large tables may be split into thousands of files.

The files are partitioned by row, each containing the full set of columns imported from the source table (while typically all columns of the source table will be imported this need not always be the case). Additional columns of management data may be added to the imported tables for management purposes during import, for example to record import timestamps and the like. The files are placed in a directory structure, such that the files associated with a single source table preferably reside in a common directory (e.g. with separate directories for each source table, though alternatively files could be spread across multiple directories e.g. depending on whether the tables are partitioned at source).

Apache Hive enables a database structure to be applied to these files, such as tables and columns, and the structure information is stored in the Hive database known as the Hive Metastore. Thus, the term "Hive tables" is used to describe the table structures that are applied across the many files in a HDFS file system, providing a logical data representation layer above the HDFS files. A Hive table is thus a collection of structured HDFS files with each file corresponding to a partition of the source table comprising a subset of the rows of that table. Hive commands (using HQL) are available to access this data and also to update the table structure. HQL provides a similar syntax to SQL.

Data manipulated directly by operations system 116 may be stored in an analogous fashion or in any other suitable manner. For example, some data may be stored as a collection of Hive tables 108 as described above and manipulated via HQL queries. Other data may be stored as simple files 109 in the HDFS.

In a preferred embodiment, the Hadoop platform is configured to maintain two operational databases; the first is referred as OPEN, and the other CLOSED. OPEN stores a copy of the current source system tables, whereas CLOSED stores the full history of these source system tables including deleted records, and older versions of records which have since been updated.

Target data repository 130 is a replicated version of repository 110. As such it contains a copy of data from the source repository. Note that this may be a complete replication of all data or only of a defined subset. Furthermore, the target data repository may store data using identical data structures or data may be structured in a different way. In the following description it will be assumed that the target data repository is a complete copy and that both the data structure and content are identical.

The data in either data repository may be made available to external processes and devices, e.g. operations system 116, analytics component 112 and reporting component 114. The latter are shown associated with the target repository 130 since in this example the target repository is intended to support analytics/reporting functions, but more generally any suitable processes and systems may access data in either repository.

Replication System

The replication system 120 is responsible for replication from the source to the target data repository. The replication is preferably performed essentially on a continuous basis so that the target data repository remains synchronized with the source data repository. This may mean that data changes are replicated as they occur, or that replication is performed on a regular/periodic basis, but at relatively high frequency (e.g. once every second or every few seconds, once a minute or every five or ten minutes). In this way, data remains substantially synchronized (unlike, say, in a nightly batch process).

More generally, change detection/replication frequency is preferably configurable. By using a sufficiently high change detection/replication frequency, essentially real-time (or at least near-real-time) synchronization can be achieved. Lower change detection/replication frequencies can be used to implement asynchronous replication (e.g. similar to nightly batch replication).

Figure 2:
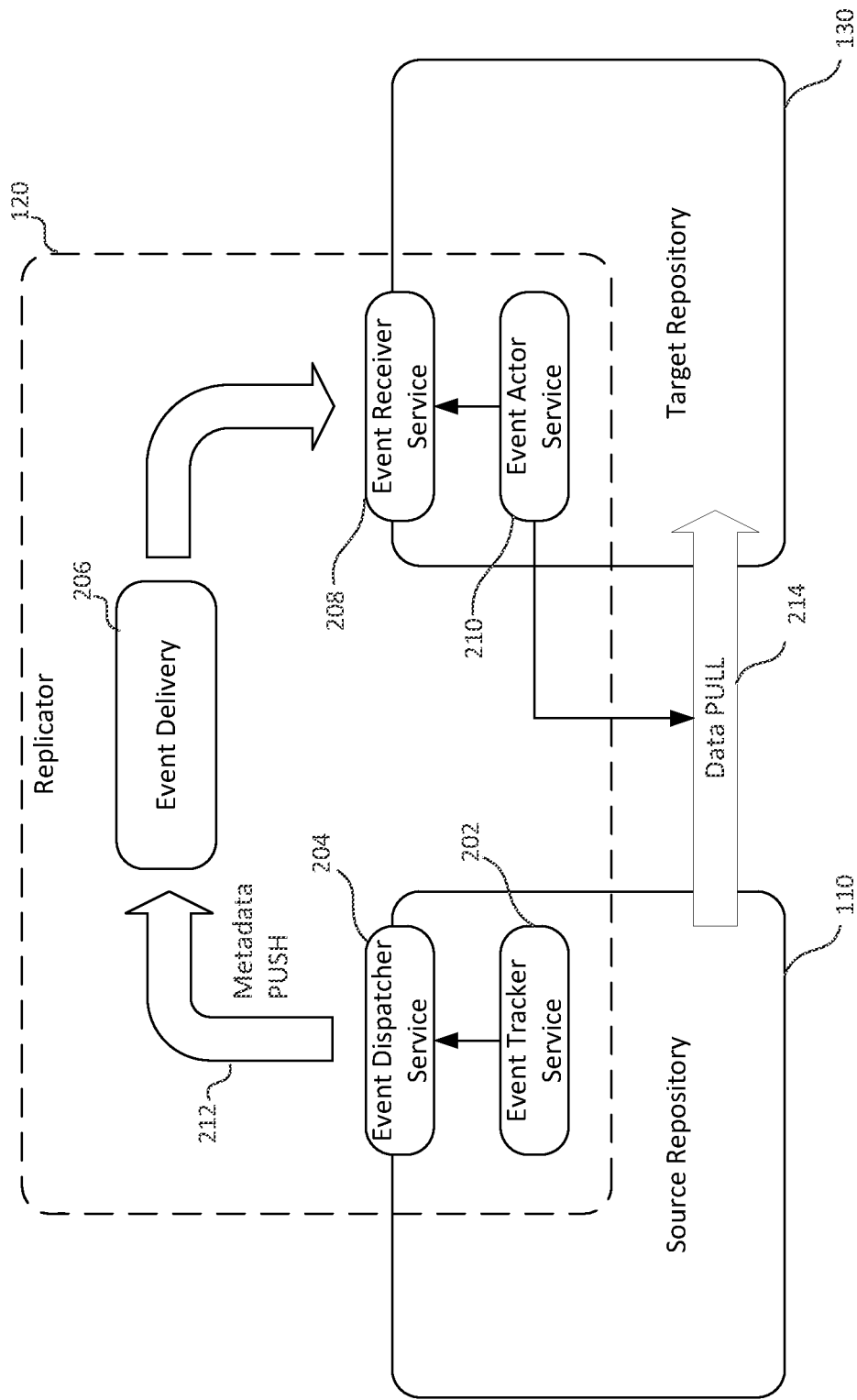
FIG. 2 illustrates the architecture of the data replication system.

The operation of the replication system is illustrated in overview in FIG. 2.

The replication system 120 operates based on an event distribution model centring on an event delivery component 206. The system further includes an event tracker service 202 and event dispatcher 204 at the source repository and event receiver service 208 and an event actor service 210 at the target repository.

Relevant events occurring at the source repository 110 are captured by event tracker service 202 and provided to event dispatcher service 204. The relevant events include any events occurring at the source repository that may require action at the target repository to ensure that the repositories remain synchronized.

Broadly speaking, relevant events include:
events involving changes to the structure of data stored in the Hive tables at the source repository (e.g. data model changes),
changes to the Hive table data itself (i.e. to the data content), and
changes to other files (i.e. ordinary HDFS files not containing Hive table data).

For Hive table changes, structural changes typically include changes resulting from data definition language (DDL) commands, and may include, for example:
Create/drop/truncate table
Add/delete column
Alter objects
Create/delete view
Add/drop partition Data content changes for Hive tables typically include changes resulting from data manipulation language (DML) commands, and may include, for example:
adding one or more rows into a Hive table (e.g. HQL INSERT statements)
updating one or more rows in a Hive table (e.g. HQL UPDATE statements)
deleting one or more rows in a Hive table (e.g. HQL DELETE statements)

DML and DDL commands are typically part of database interface languages (e.g. SQL/HQL) but changes may be implemented in any suitable manner (e.g. programmatically via suitable APIs).

Change events for ordinary HDFS files may include:
create data files
append data to files
change data files
delete data files Note that in some embodiments, the system may only support creating, appending to and deleting of HDFS files, with other forms of file updates (e.g. overwriting/random access) not being supported.

The above are examples of events that may be captured by event tracker service 202. Additional and/or alternative events and event types may be captured based on storage technologies, synchronization requirements etc.

Event Dispatcher service 204 formats the events into event messages and transmits these to an event delivery subsystem 206. The event delivery subsystem 206 delivers received events to any destination registered with the event delivery subsystem as a recipient for the events. In the present case, an event receiver service 208 at the target repository 130 is registered as recipient of the events (in other embodiments, multiple receivers for the events may be registered and different recipients may register to receive different types of events as discussed in more detail later). Received events are provided to an event actor service 210, which enacts any changes resulting from the events in target repository 210.

In a preferred embodiment, the events transmitted describe the changes occurring at the source repository but do not include data content (or at least, may not always include all necessary data content). Any required data content relating to changes in the source repository is retrieved from the source repository by the event actor service 210 when enacting the changes.

Thus, the flow of information involves two separate paths: events carrying change metadata (information defining changes having been made in the source repository 110) is proactively pushed via the event delivery subsystem (flow 212), whilst data content is pulled (retrieved) by the event actor service 210 when implementing changes in the target repository (flow 214).

As an example, a set of rows may be added to an existing table in the source repository, e.g. via an INSERT operation. This triggers an event which is pushed via the event delivery subsystem to the target repository. The event (or possibly a set of related events) includes information describing the change. This information could, for example, include one or more of:
a table identifier of the modified table,
an operation identifier, in this case indicating that a row insert operation has been performed
an indication of the number of rows inserted;
one or more row identifiers of inserted rows.

However, in this approach the event does not include the row data itself (i.e. the field values of the inserted rows).

The event actor service 210 receives the event (via event delivery system 206 and event receiver service 208) and transmits a read request to the source repository 110 to retrieve the row data (e.g. by passing the row identifiers for the inserted rows). The source repository retrieves the requested data and transmits it in a response to the event actor. The event actor 210 then performs a row insert operation in the target repository (e.g. by issuing the appropriate HQL command) using the received data to insert the rows into the identified table in the target repository (alternatively, data may be transferred at the file level as discussed further below).

In the present embodiment, the replicator system 120 comprises software components located at (or forming part of) both the source repository 110 and target repository 130 as well as software components external to the source and target repositories. However, in practice the components may be distributed in any appropriate manner and may form part of and/or be external to the source/target repositories.

Figure 3:
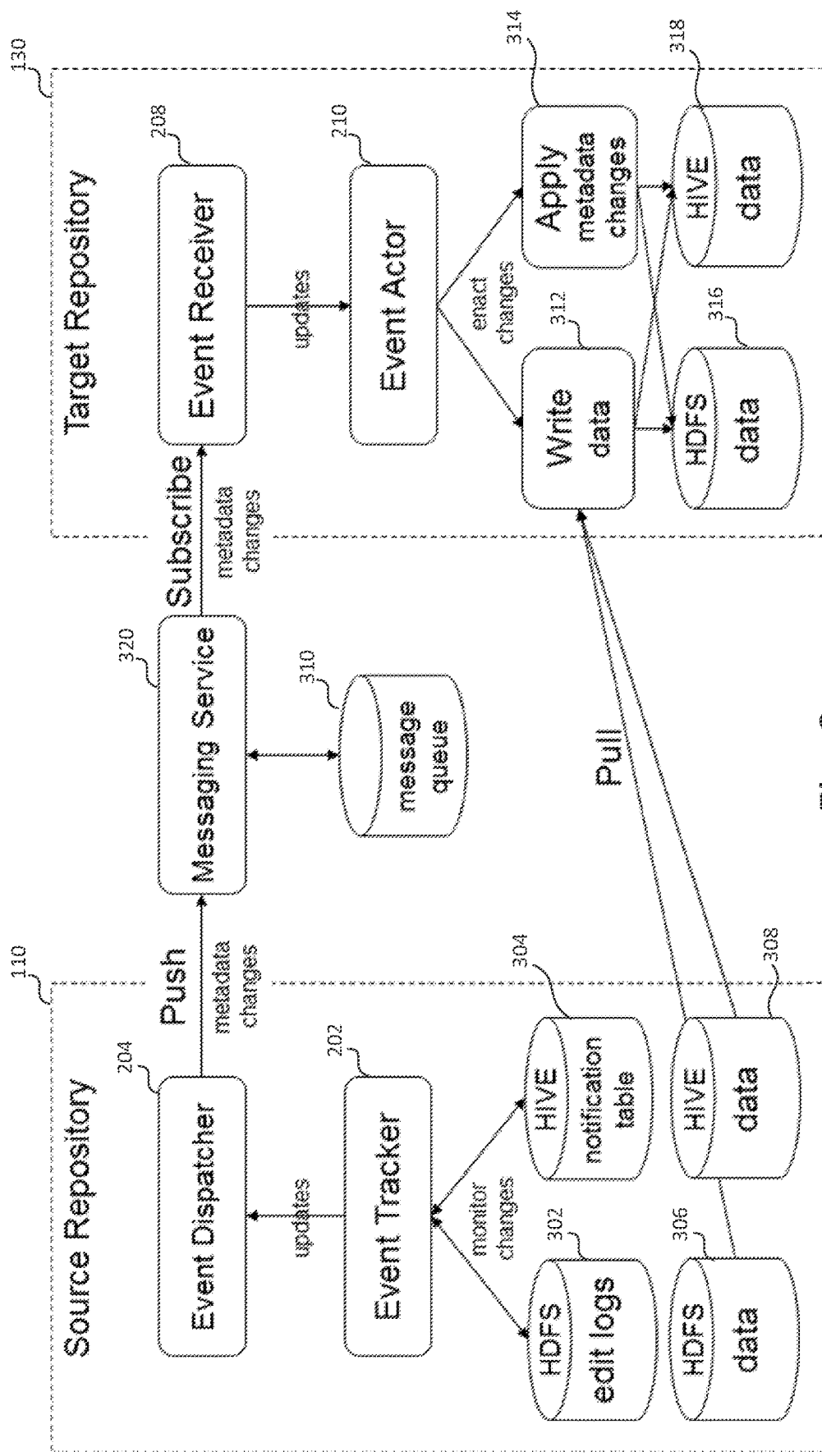
FIG. 3 illustrates the operation of the data replication system.

FIG. 3 provides further detail on the implementation of the replication process, in the context of HDFS/Hive data repositories. In this example, the replication system supports replication of both Hive tables and ordinary HDFS files.

As described above, the event tracker 202 monitors changes in the source repository 110. Specifically, in this implementation, the event tracker monitors HDFS edit logs 302 and HIVE notification table 304.

The HDFS edit logs 302 provide a record of all the file create/append/delete requests received by the repository. The Hive notification table 304 contains a record of all relevant updates (e.g. including DDL-type and DML-type events) relating to Hive tables. Alternatively information on DDL-type, i.e. structural, changes could be obtained from a different source than DML-type, i.e. content, changes (for example, the database may provide a separate metadata change log and data content change log). The event tracker 202 is a background process that constantly monitors the edit logs and notification table for new entries. In one example, the event tracker monitors the edit log file/notification table every few seconds. The precise frequency is preferably configurable to suit a specific implementation.

The event tracker 202 forwards detected events to the event dispatcher 204 which formats them into event messages and submits the event messages to the event delivery system.

The event delivery system 206 is implemented by way of messaging service 320. In a particular embodiment, this is implemented using the Apache Kafka messaging service though other technologies may be substituted. Messages are submitted to the messaging service by event dispatcher 204. The messaging service maintains a message queue 310 of messages for delivery. The event receiver 208 subscribes to the desired messages at the messaging service 320. As a result, the relevant messages are delivered by the messaging service to the event receiver 208.

The Event actor 210 enacts changes as appropriate for the event type. Changes implemented by the event actor may include applying data changes 312 and/or metadata changes 314.

For Hive data (i.e. data stored as Hive tables in the repositories), data changes (which may correspond to DML commands as discussed above) may include inserting rows, updating rows and deleting rows in a table and these are implemented by the event actor 210 by performing corresponding operations in the target repository (in Hive data 318). Metadata changes involve changes to metadata defining the structure of the data, and hence to the data structures themselves (e.g. corresponding to DDL commands), and such changes may include creating a new table or dropping a table, modifying the structure of an existing table e.g. by adding or deleting a column, etc. The event actor enacts these by applying the same DDL changes to the target repository (which may including updating the Hive data 318 and Hive metastore as needed).

In the case of data changes 312 the required data (e.g. the row/field data for inserted/updated rows) is retrieved ("pulled") from the relevant source data structures in source repository 110, including HDFS data 306 and HIVE data 308.

For Hive data updates, data retrieval may be performed by sending appropriate HQL queries to the source repository. Alternatively this may be done by copying the file(s) containing the updated Hive table data (where the table is partitioned it may only be necessary to copy the file(s) with changed data). For HDFS files the new or modified file may be copied (e.g. the whole file, or just a relevant part of the file). File copy may use a tool such as distcp, though any suitable method may be used for copying the files.

Data updates 312 and metadata changes 312 are applied to the corresponding HDFS data 316 and Hive data 318 in the target repository. For example, data retrieved from source repository 110 may be written to the target Hive table(s) 318 by issuing the appropriate Hive DML statement(s), and metadata changes (i.e. data structure changes) may be implemented by issuing the relevant Hive DDL statements).

For HDFS file events, if a new file has been created or an existing file is replaced by a new version, then the actor will copy across (pull) the file to the target repository. If a file was deleted then the actor will delete the file on the target repository.

In preferred embodiments, the replication system components are designed to run as services, so that no scheduler is required.

The event data sent as part of an event may vary depending on the type of event and may differ between events relating to Hive table changes and ordinary file changes. The events include the specific details of the changes to tables and files that have occurred on the source repository. As set out above, the target repository subscribes to the event messages and then applies the events locally. If the event requires data to be copied across, then this is pulled from the source repository.

Figure 4:
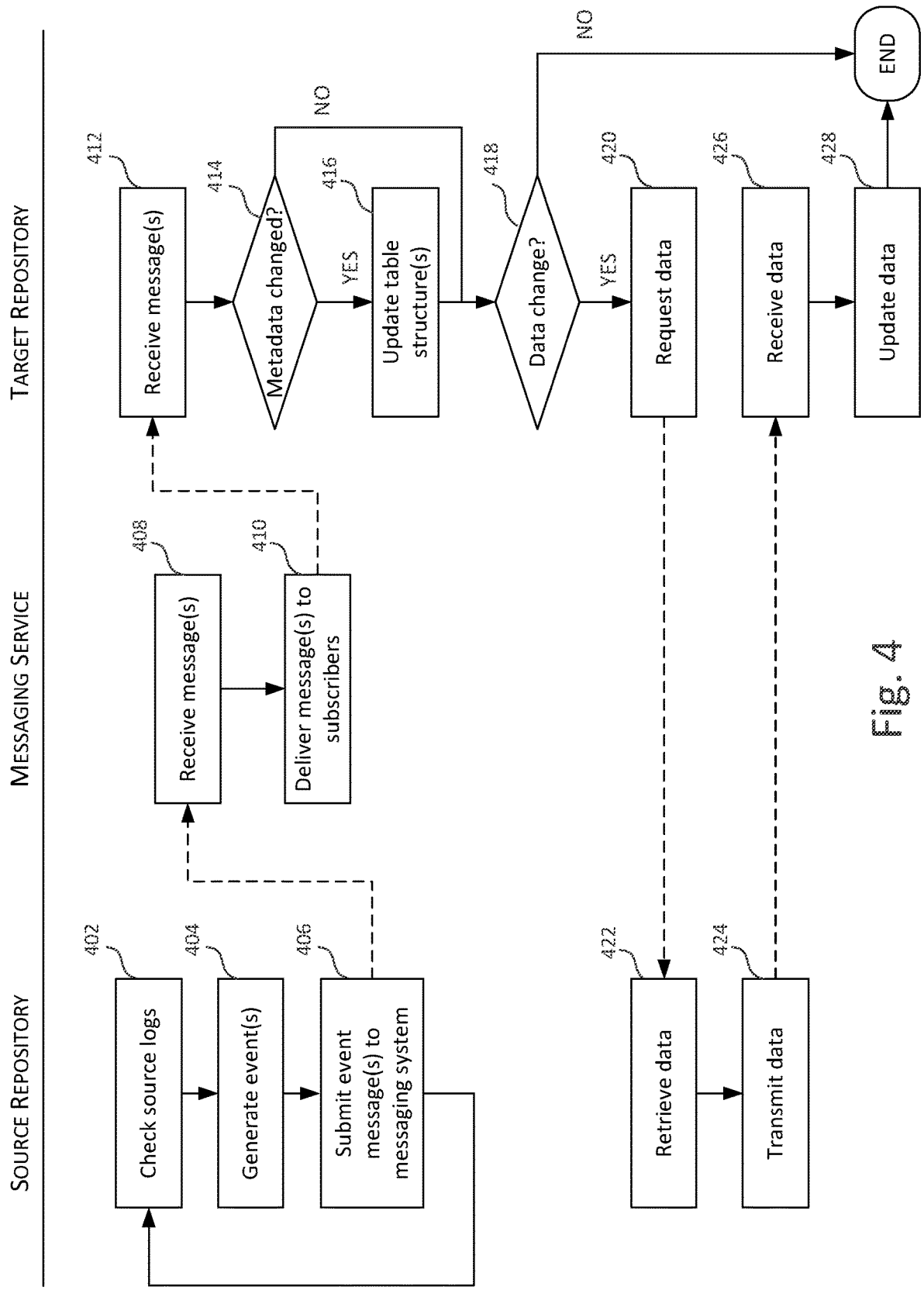
FIG. 4 illustrates a data replication process.

FIG. 4 is a process diagram summarizing the synchronization process. The process is shown in three columns, with the left-hand column including steps performed at the source repository, the middle column including steps performed at the messaging service and the right-hand column including steps performed at the target repository. Control flow is shown as solid lines and message flow as dashed lines.

In step 402, the event tracker checks the source repository logs/notification table to identify any changes that need to be notified to the target repository. In step 404, event messages are generated for any identified changes. In step 406, the event messages are submitted to the messaging system. Process 402, 404, 406 is repeated on a continuous basis. For example, the process may be repeated periodically, e.g. every minute or every five minutes. Alternatively, the process could be triggered by updates to the logs, or in any other suitable way.

In step 408, the messaging service receives the event messages. In step 410, the messaging service transmits the messages to any subscribers (i.e. entities having previously registered to receive the relevant class of message), here including the event receiver service at the target repository.

In step 412, the event receiver at the target repository receives the messages. In step 414, the event actor determines the type of changes to which the event messages relate. If an event involves a change in repository metadata and/or or data structures, the target repository metadata is updated and/or the data structures are modified as needed in step 416 (e.g. to add a column to a data table). Subsequently, or if no metadata changes have occurred, then the event actor determines (step 418) whether any changes to data content are required. If not, the synchronization process ends.

If data content changes are required, then in step 420, the event actor (or an associated update module) transmits a request for the relevant data to the source repository. In step 422, the source repository retrieves the requested data (e.g. from the relevant Hive tables) and transmits the requested data in step 424. In step 426, the target repository receives the requested data and performs the necessary update to the relevant files or data table(s) at the target repository (e.g. performing a row insert or update). The synchronization process then ends.

Note that some data changes, in particular deletions (e.g. of table rows or whole tables or files), may not require data to be obtained from the source repository. In that case steps 420, 422 and 424 may be omitted and the process may proceed to the updating step 428, e.g. to delete particular rows from a table.

Extensions to Event-Based Replication

In the described embodiment, the replication system uses an event-based approach. Every event may be considered a separate action, and each action on the source repository is replicated to the target repository via the event notifications.

Preferably, events for different directories or tables in the target repository may be consumed asynchronously and in parallel (for example by way of multiple parallel instances of the event actor service).

The described approach based on event message distribution is particularly flexible and can allow a variety of replication scenarios to be implemented.

For example, the system can be expanded to allow replication to multiple target data repositories at the same time (one-to-many replication). To achieve this, another target repository may register with the messaging service to receive the relevant event messages. The messaging service will then deliver the relevant event messages to both target repositories where the relevant change events can be enacted. Any number of replication destinations may be supported in this manner.

Similarly, replication from multiple source repositories to a single target repository (many-to-one replication) may be implemented by having multiple source repositories output event messages to the messaging service in the manner described, with a single target repository subscribing to event messages from both source repositories and implementing the received change events as required (e.g. to form a single backup data store containing all or selected data from both source repositories).

Furthermore, the system may support replication between heterogeneous systems, e.g. between a Hadoop/HIVE source and a non-Hadoop target system (e.g. a conventional relational database). This may be achieved by implementing suitable event receiver/actor services at the alternative target system, with the actor service adapted to implement the changes as required in accordance with the data storage paradigm and technologies employed at the target system.

Selective replication may also be implemented. For example, a given event receiver may subscribe only to particular relevant event messages or may filter received messages, with only relevant messages being processed/forwarded to the event actor (alternatively filtering may occur at the event actor). As a concrete example, a given target repository may select to receive messages only for a specific subset of Hive tables in the source repository (e.g. where the target repository supports analytics functions for which only a subset of the data is relevant). As another example, a target repository designed to maintain a historical record may choose to replicate only record insertions but not record deletions (or could enact deletions by marking records as deleted in the target repository without actually removing them from the Hive table).

More generally, the event actor could implement additional processing, for example to reformat or otherwise modify data before the data is written to the target repository. Event filtering or data modification/pre-processing could alternatively/additionally be performed at the source repository e.g. by event tracker 202 and/or event dispatcher 204.

While in the examples described previously, replication occurs essentially on a real-time (or near-real-time) basis, replication could alternatively be performed with a delay. For example, changes may be applied to the target repository after a specified delay duration (e.g. after 24 hours) or at a specified time (e.g. at midnight, at the weekend etc.) This may be appropriate when replication is performed for backup purposes. The replication delay is preferably configurable.

Thus the event-based replication mechanism allows the system to provide functionality beyond merely maintaining a synchronized backup of the source repository.

The various approaches and scenarios may be combined in any appropriate manner to provide a complex replication system—for example, a source repository may replicate a subset of data to a first target repository and another subset to a second target repository (possibly with different replication delays—e.g. one may be real-time with the other being delayed), with the second target repository combining that data with another set of data replicated from a further source repository (many-to-many replication). At the same time the target repository may perform data filtering or pre-processing (e.g. to calculate data aggregations to support analytics queries).

The replication system is preferably configurable dynamically by an operator. For example, a web-based or other graphical user interface can be provided allowing an operator to start/stop the service, configure event subscriptions by one or more event receiver(s), configure replication frequencies and time schedules/delays, and to perform reporting tasks.

Example Computer Node Architecture

Figure 5:
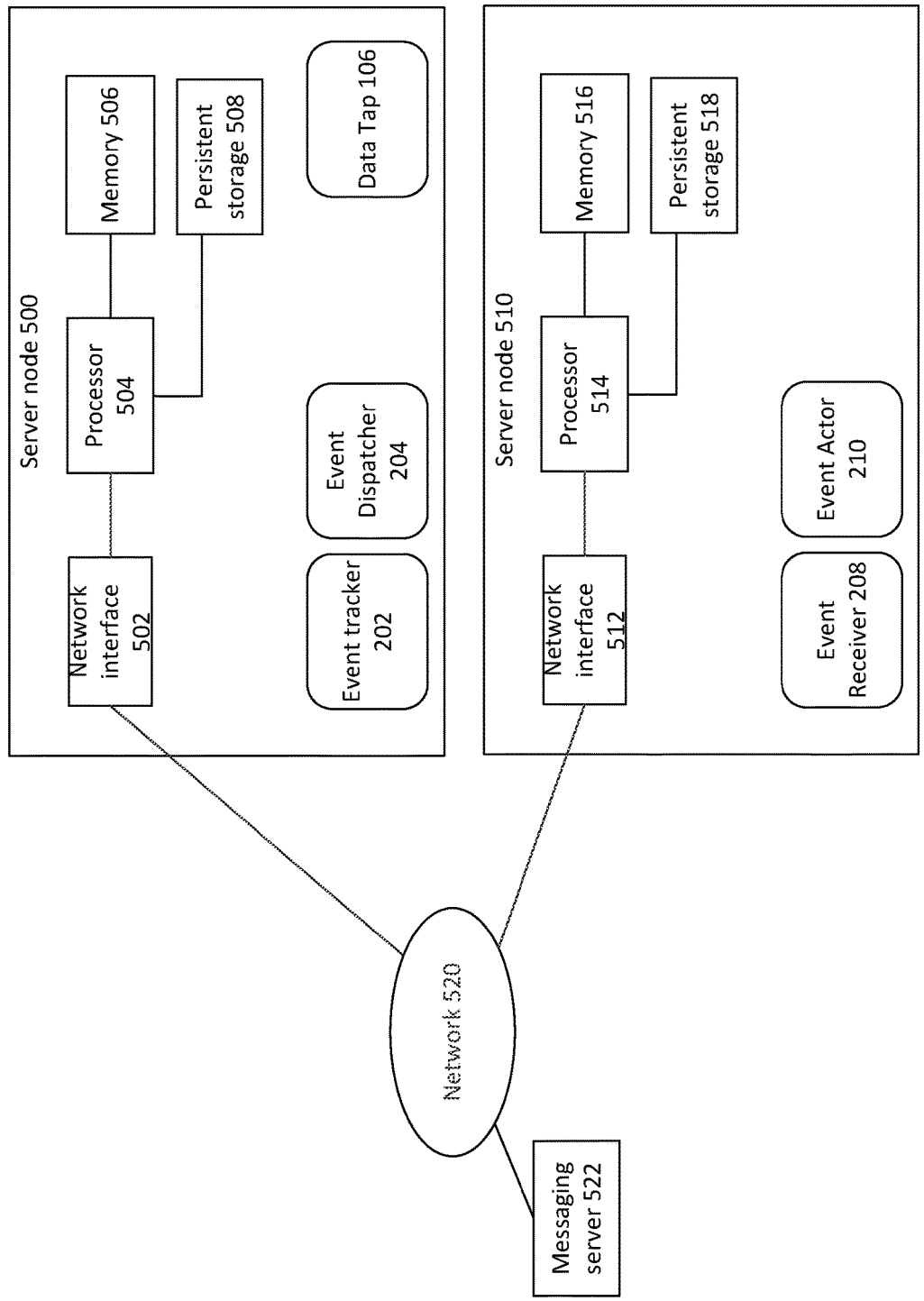
FIG. 5 illustrates a hardware/software architecture of processing nodes that may be used to carry out the described replication process.

FIG. 5 illustrates computing nodes that may be used to implement the processes described above. Here, a first processing node 500 implements functions of the source repository, while a second processing node 510 implements functions of the target repository. The processing nodes may, for example, comprise conventional computer servers.

The first processing node 500 may include a processor 504, volatile memory (RAM) 506 (e.g. for storing software code being executed and transient data) and persistent storage 508 (e.g. hard disk or solid-state storage devices) for storing software for execution by the processor and persistent data. The persistent data may include the HDFS files including Hive tables, the Hive metastore etc.

The software may include a server operating system and Hadoop/Hive software (not shown) as well as the event tracker module 202, event dispatcher module 204 and Data Tap module 106. While in this example the various functions are shown as combined in single node 500, there may be multiple such nodes (e.g. forming a Hadoop cluster implementing the source repository), with the functions distributed in any appropriate manner across the cluster nodes.

The computing node further includes a network interface 502 for communication with network 520 (which may include local and wide area networks, e.g. the Internet). The node may communicate via the network 520 with the messaging server 522 and thereby (indirectly) with node 510 at the target data repository. In some embodiments, direct communication may also be possible (e.g. where the messaging service is integrated into node 500 and/or node 510, or where the system is implemented without use of a messaging service).

The computing node may include further conventional hardware and software elements as known to the skilled person.

Computing node 510 at the target repository includes corresponding hardware and software components (e.g. network interface 512, processor 514, memory 516 and persistent storage 518). However, instead of the event tracker and event dispatcher, node 510 comprises the event receiver module 208 and event actor module 210. As for node 500, node 510 may be one of a collection of nodes forming a Hadoop cluster that implements the target repository.

Messaging server 522 may similarly be based on a conventional server architecture, comprising one or more computing nodes with storage for storing event messages and networking facilities for receiving and distributing messages.

Data Tap

As mentioned previously, in addition to the data replication system for replicating between data repositories, the system may include a tool referred to as "Data Tap" for importing data into a repository from an external data source such as a conventional relational database. The Data Tap tool, shown in FIG. 1 as element 106, will be described in the following sections with reference to FIGS. 6A to 12. Here, the data repository is also referred to as "data lake".

The Data Tap tool 106 comprises the following components:
1) Metadata Generation and Schema Evolution
2) Difference Calculator
3) History Capture The Data Tap framework is flexible and provides the capability to ingest data from any relational database into the Hadoop data lake. The Metadata Generation and Schema Evolution tool not only provides the capability to seamlessly deal with changes to the source schema, but also provides the capability to automate the Hadoop development that would have been required to ingest additional tables and data from new data sources (in some cases removing the need for human intervention/development effort altogether).

The Difference Calculator is used for data sources that do not have the capability to provide change data in an incremental manner.

The History Capture process provides the means of creating the OPEN and CLOSED partition for each day, containing the current data set and historical data respectively.

Figure 6A:
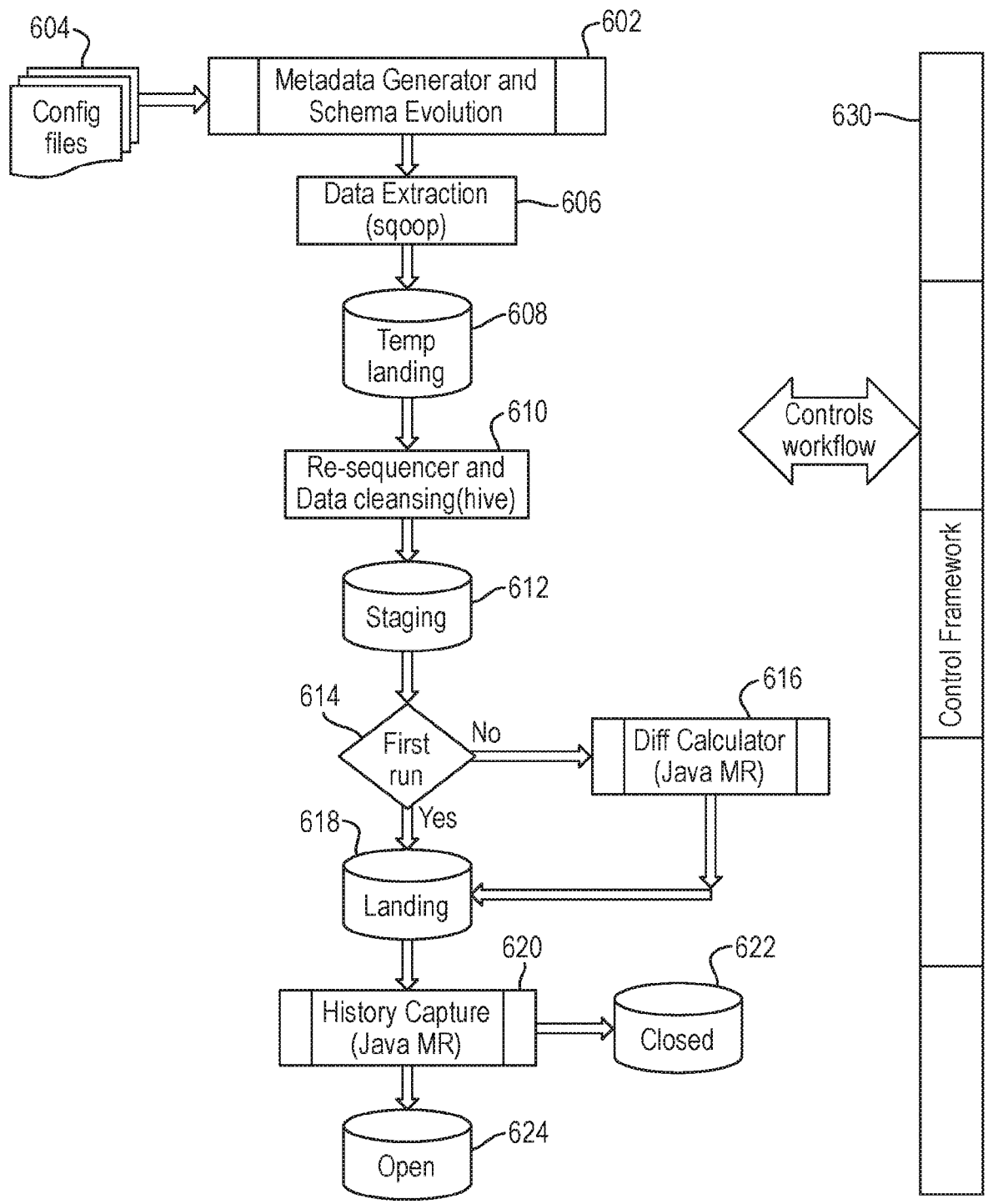
FIG. 6A illustrates a high-level process for importing data from a relational database into a data lake.

FIG. 6A illustrates the Data Tap import process in relation to a particular table being imported from a given source database. The depicted process is repeated for each table to be imported.

The metadata generator and schema evolution process 602 retrieves and stores metadata for the table being imported and deals with changes to the metadata. The metadata defines the schema of the table being imported, i.e. the table structure and field definitions. The metadata extraction may be controlled by way of configuration files 604.

The metadata is used in a data extraction process 606 to extract data from the table in the source database. In the present example, Sqoop scripts are used to perform the extraction but other technologies may be substituted.

The data extraction process reads the contents of the table from the source database. The extracted data is stored in a temporary landing area 608 within the data lake.

A re-sequencer and data cleansing process 610 (e.g. implemented using Hive commands or scripts) pre-processes the data and stores the pre-processed data in a staging area 612. Re-sequencing involves changing the column order of a row to ensure that the columns which are keys are the first ones in each row when stored in Hadoop which can improve access efficiency. Cleansing involves other processing to place data into the appropriate format for Hadoop, e.g. by removing spurious data, reformatting data etc. In one example, cleansing includes the process of removing erroneous spaces that are introduced when using Sqoop against an Oracle database (due to a known bug with Sqoop). More generally, the re-sequencing/cleansing scripts can be used to configure other required data transformations, depending on application context and specific needs. Preferably, the re-squencer/data cleansing process also generates table information files which store the table and column information of a file after the columns have been re-sequenced and cleansed.

If the import is a first run (check 614) for the given data source, e.g. the first time a particular table is imported, then the whole data set is moved to a landing area 618. If not, then a difference calculator process 616 performs a difference calculation to identify the differences between the current table contents, as read in the data extraction step 606, and a previously imported version of the same table. The difference between the older version and the currently imported version (also referred to herein as the table delta) is then stored in the landing area 618. Thus, the landing area 618 will contain full data for a table if this is the first time the table is imported or the delta if the table had previously been imported.

A history capture process 620 then updates the Hive tables in the data lake. This involves both updating the current values as recorded in the OPEN database and maintaining historical information in the CLOSED database. The history capture process is described in more detail below.

A control framework 630 manages the Data Tap workflows. In one embodiment, this uses Unix shell scripting to manage the complete workflow of the data import processes. The control framework preferably gives restart ability from any point of failure and provides logging and error tracking functionality to all involved processes.

Note that the above example describes the use of a difference calculator to generate a table delta for a previously imported table. However, in some cases the source database may be able to provide delta information directly, in which case the difference calculator may not be needed.

FIG. 6B illustrates in more detail the process of importing a table 104 from a source database into a Hive table 108 in the data lake. The process starts in step 640 with the Data Tap tool connecting to the source database. In step 642, the metadata for the table is extracted into one or more metadata files 644. Data Tap then identifies whether the table is a new table (not previously imported) or a previously imported table in step 646. If the table is new then the corresponding Hive table 108 is created in step 648 (e.g. by issuing a "Create Table" command), based on the extracted metadata defining the source table, and the process proceeds to step 654 (see below).

If the table has previously been imported, then the extracted metadata 644 is compared to existing metadata stored for the table in step 650 to identify whether the metadata has changed in a way that requires changes to the Hive table 108 (note that not all schema changes in the source database may require alterations to the Hive table, as discussed in more detail below). Changes to the table schema may also necessitate regeneration of Sqoop and HQL data import scripts as described in more detail below. If changes are required, then the Hive table is altered in step 652 (e.g. by issuing an "Alter Table" command). If the schema for the source table (as defined in the metadata) has not changed, or any changes do not require alteration to the Hive table, then the process proceeds directly to step 654.

In step 654, the Sqoop script for the table is run to extract the table data into temporary storage. Note that, for a previously imported table, the extracted data may be a delta of changes since the last export if the source database supports delta reporting, or the extracted data may be the full table contents, in which case the difference calculator may be run to identify any changes since the last import as described in more detail below. In the case of a new table, the full table contents are read by the Sqoop script.

The table data (either full table contents or a table delta) are then inserted into the Hive table 108 in step 656.

In a preferred embodiment, table information files 660 ("tableinfo") are preferably maintained and are used to store the column information for the tables maintained in the Hadoop filesystem (after the tables have been re-sequenced and cleansed, e.g. to place key columns first in the column order and remove any erroneous spaces between columns). The table information files are updated in step 658 to reflect any changes detected during import.

Metadata Generation and Schema Evolution

The Metadata Generation and Schema Evolution process 602 performs the following functions:

- Collection of metadata at runtime for any materialized RDBMS tables in the source database
- Creating tables in the Hadoop environment at runtime according to the metadata
- Identifying changes to metadata for the tables, at runtime, which would affect the Hadoop environment
- Applying schema changes for the tables to the Hadoop environment, at runtime
- Sqoop and Hive script generation at runtime according to the table metadata
- Regeneration of Sqoop and Hive scripts as necessary if schema changes are identified Ordinarily, to import data from any RDBMS system to Hadoop, bespoke import scripts (e.g. using Sqoop) are written according to the data schema of the tables being imported. However, writing the necessary scripts is time consuming (in typical examples three or more development days may be needed to add tables to the data lake for a new project, with additional time for quality assurance). This adds to the implementation complexity and cost of projects. Furthermore, if the RDBMS data schema changes then similar development efforts are required to upgrade scripts used for import.

Embodiments described herein reduce or eliminate the development efforts required to ingest new RDBMS tables or deal with changes in source database schemas.

The Metadata Generation and Schema Evolution process provides the following functional components.

Metadata Generator—

The metadata generator collects metadata of materialized tables from any RDBMS system and stores the metadata in a metadata repository. The metadata is utilized to generate Sqoop/Hive scripts to import the data from the RDBMS to the Hadoop environment.

Schema Evolution—

The schema evolution function identifies changes to metadata of materialized tables of any RDBMS. If any changes are found which would affect the Hadoop environment for the table, the Hadoop environment is altered accordingly at runtime (and scripts are regenerated) with no system downtime or any manual preparation.

Archival of Metadata—

Metadata is archived, including both metadata describing the initial data schema for a table (at first ingestion) and subsequent changes. Preferably, the metadata is archived in such a way that the table can be re-created from initial metadata and the same schema evolution can be applied to it to evolve its schema to the latest schema. This may facilitate evolving schemas in development/test environments.

The Metadata generation and Schema evolution process is designed to use a common Java API to extract metadata for a table for any RDBMS. Preferred embodiments use the DatabaseMetaData Java API to retrieve metadata (and identify any changes to the metadata) for any RDBMS source. If the schema for a table is changed at the data source the schema for the representation in the data lake is modified accordingly.

Schema discovery is performed dynamically. Dynamic schema discovery from the source system is carried out at run time and necessary actions are applied to the data lake, if any. This can allow tables in existing data sources to be added to the data lake without any manual development effort.

Figure 7:
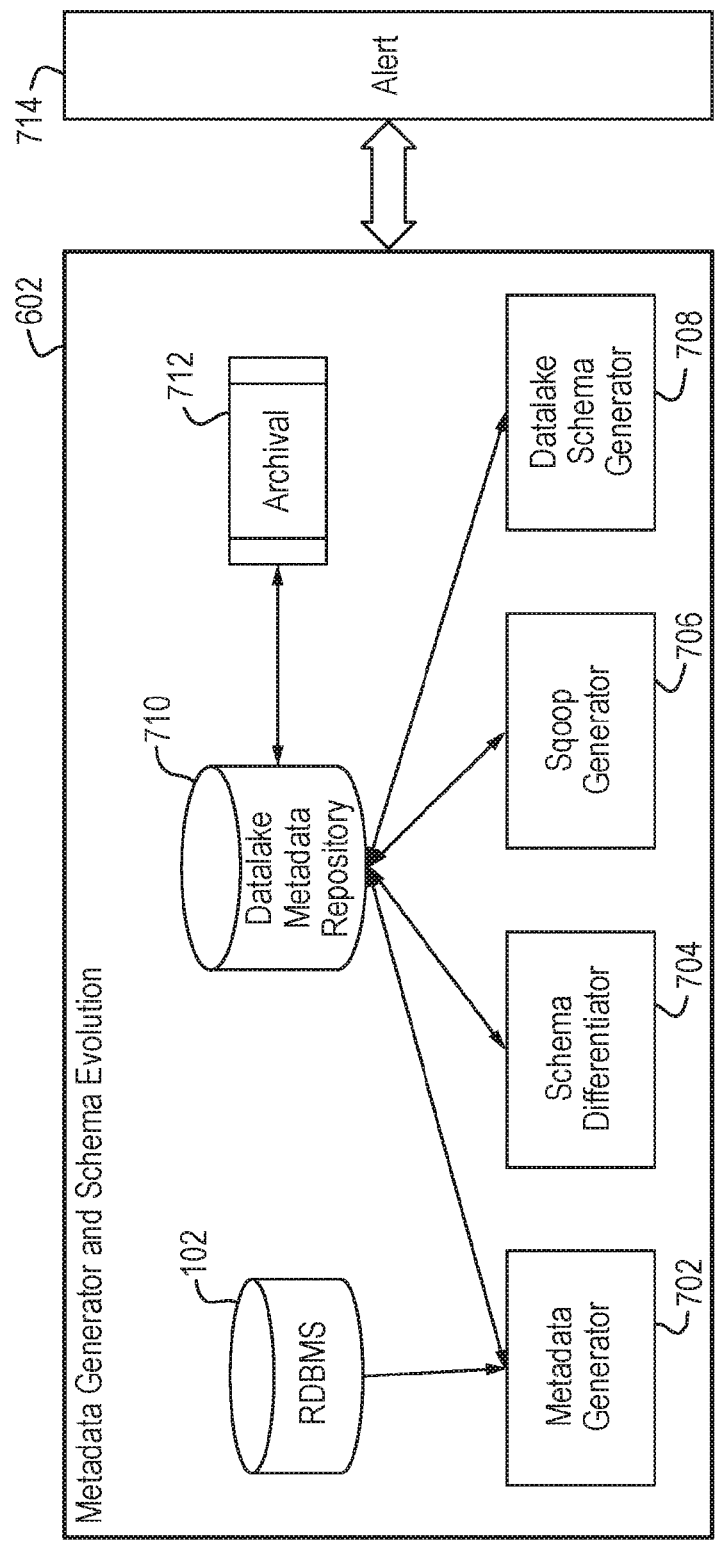
FIG. 7 illustrates functional components of a metadata generator and schema evolution module.

FIG. 7 illustrates core modules of the Metadata Generator and Schema Evolution process.

The Metadata generator 702 reads metadata for a table from the relational database management system (RDBMS) of a data source 102 using DatabaseMetaData APIs provided by Java, which provide a common platform to read metadata for different database sources. By way of example, the following information is collected for each column of each table to be imported.

- Table Name
- Table Description
- Source—This indicates the source system or database
- Column name (this may need special handling while generating Sqoop scripts if the column name cannot be used in the scripts, in which case the column name is marked accordingly)
- Sqoop column name—If a special case is identified for the column name (see above) then the column can be re-named in the data lake. The new name is recorded here.
- Column Data Type
- Column Description
- Key type (if a column is part of index for a table, then this is marked as 'P' for source keys or else as 'S' for other types of key). Other columns may be marked with particular flags; for example, internal management data columns added during import may be identified with appropriate flags.
- Process As—this indicates how this column will be represented/processed in the data lake. In a preferred embodiment, all columns are imported and processed as String data types (with any necessary data conversion performed automatically)
- Nullable—flag set to 'true' if the column is allowed to take a null value in the source table, otherwise the flag is set to 'false'
- DeltaView Prefix—This is used for Oracle Data Integrator feeds only, and is used by the Re-sequencer and Data Cleanse process to determine the name of the database journal view to be used as input. The DeltaView Prefix refers to the prefix of the name of the database view of the source system journal database, e.g. For the CRM table called "ADRC", the view name of the journal database is "CRM_JE_ADRC", hence the DeltaView Prefix is "CRM_JE_".
- Validate As—this is the data type against which the column value should be validated if data is processed in the data lake.

The specific metadata collected may vary depending on the type of source database.

The schema metadata is stored in a metadata repository 710, for example in CSV (comma-separated values) format (e.g. as a CSV file per source table) or in any other suitable manner. The metadata repository may be stored in the data lake or separately.

The Schema Differentiator 704 identifies schema changes in the source 102 for each table. If a schema change is identified the old schema will be archived in an archive directory and the new schema will be kept for further processing. The schema differentiator also provides a signal to the Sqoop Generator 706 and Data lake schema generator 708 to generate new Sqoop scripts and corresponding HQL scripts.

In preferred embodiments, the schema evolution process may only act on schema changes which would potentially impact storage and processing of the data in the data lake. In a preferred embodiment, the following schema changes are considered as potentially affecting the data lake data representation:

Addition of a column to a table

Unique index change for table

The following changes are not considered to affect the data lake data representation:

Deletion of column

Renaming of a column

Change in column length/size

Change in data type (as the data lake considers all columns to be of type String)

Sequence change of columns

However, whether or not specific schema changes affect the data lake representation and thus should be detected and handled depends on the specific implementation of the data lake and the data representation used. Thus, in other embodiments, the set of schema changes detected and handled may differ and changes such as column length or type change and sequence change may be handled in such embodiments.

As a particular example, in preferred embodiments, where a column is deleted in the source table, the column is retained in the data lake representation to allow historical data analysis. Nevertheless, future records imported would not include the deleted column (and the import scripts may be modified accordingly). However, in other embodiments columns deleted in the source table could be deleted from the target Hive table as well.

Furthermore, different schema changes may require different types of actions. For example:

Certain schema changes may result in changes in the target schema and regeneration of import scripts (e.g. addition of a column)

Certain schema changes may result in regeneration of import scripts but not changes to the target schema (e.g. deletion of a column in the above example), or vice versa Certain schema changes may result in no changes to the target schema or import scripts (e.g. change in column order)

Furthermore, the system may be configured to generate alerts for certain types of schema changes (even if no changes to target schema and/or scripts are needed).

The Sqoop Generator 706 reads metadata from the repository 710, and generates Sqoop scripts at run time for any source. Sqoop scripts are generated based on templates. Preferably, the system maintains multiple Sqoop templates, each adapted for a specific type of source database system. For example, different Sqoop templates may be provided respectively for mySQL, Oracle and MS-SQL databases. Furthermore, for each database system, separate templates are provided for initial load and delta load processes (assuming the database in question supports delta load). If the schema differentiator 704 identifies schema changes affecting the data import, then Sqoop generator 706 regenerates the scripts and replace the old scripts with the regenerated ones.

Imported data is stored in the data lake using a data schema appropriate to the storage technology used. The data lake schema generator 708 generates the data lake schema for each table by reading the schema metadata from the metadata repository 710. It also evolves the data lake schema in response to schema changes signalled by the Schema Differentiator. When modifying the existing schema, it maintains the history of the schema in an archive directory via an archival process 712.

The Alert function 714 provides the facility to generate alerts relating to the processing performed by the Metadata Generator/Schema Evolution process 602. In one embodiment, the Alert function 714 generates the following outputs:

success_tables—this is comma separated list of tables which have successfully completed the process of metadata generation and schema evolution fail_tables—this is comma separated list of tables which have failed in metadata generation or schema evolution index_change_tables—comma separated list of tables for which a unique index has been changed (such tables may require manual intervention to change the schema before proceeding with data import)

add_column_tables—comma separated list of tables for which columns have been added In preferred embodiments, the metadata generator and schema evolution process provides an extensible architecture at all layers (modules), like the Metadata generator, Schema differentiator, Sqoop Generator, Data Lake Schema Generator and Alerts.

Figure 8:
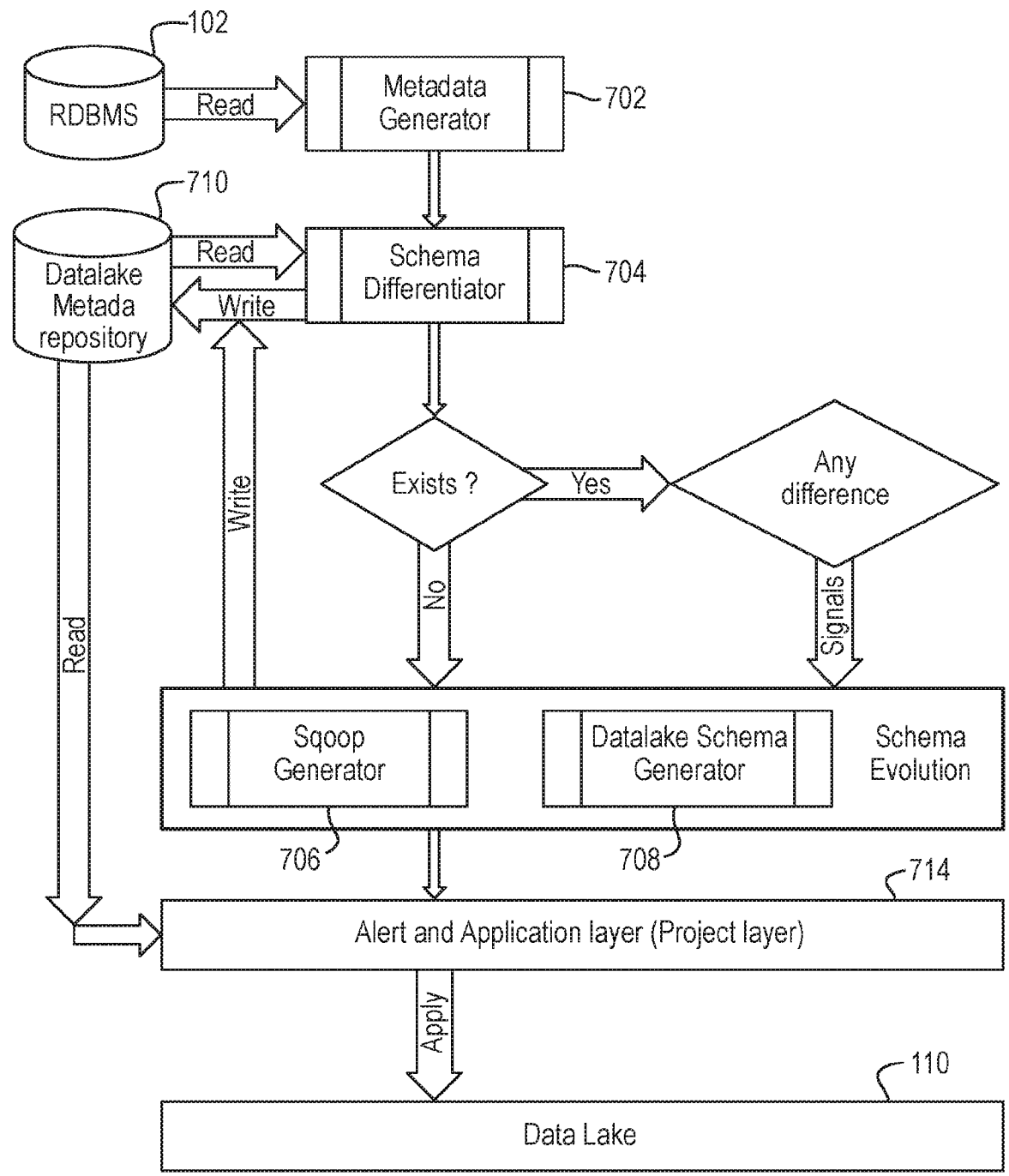
FIG. 8 illustrates the operation of the metadata generator and schema evolution module.

The operation of the Metadata Generation and Schema Evolution process is further illustrated in FIG. 8.

When the Metadata Generation and Schema Evolution process is triggered, the Metadata Generator 702 queries the RDBMS system at the data source 102 to gather metadata for one or more specified tables. Collected metadata is compared with existing metadata for the same tables in the metadata repository 710 by Schema Differentiator 704.

If existing metadata is not found for a table, then it will be treated as if the table is being imported into the data lake for the first time and a signal is sent to the Sqoop Generator 706 and Data Lake Schema Generator 708 to generate Sqoop scripts and the data lake schema (including table information files, and initial load and delta load Hive query language (HQL) scripts). Once required scripts have been generated they are stored in a local directory (specified in the configuration data), and can then be used to generate the data lake environment for the tables (i.e. the table structure, directory structure, and collection of files making up the tables). These scripts can also be used to transfer tables between Hadoop clusters.

If existing metadata is found for a table, then the Schema Differentiator 704 identifies the difference between the new table schema (as defined in the presently extracted metadata) and the old table schema (as defined by the metadata stored in the metadata repository) and applies the changes to the data lake data representation, regenerating scripts as needed. Metadata of each table is archived in an archive directory on each run for debug purposes. Also, if schema differences are identified then the schema evolution history is captured.

Generation and Operation of Import Scripts

Figure 9A:
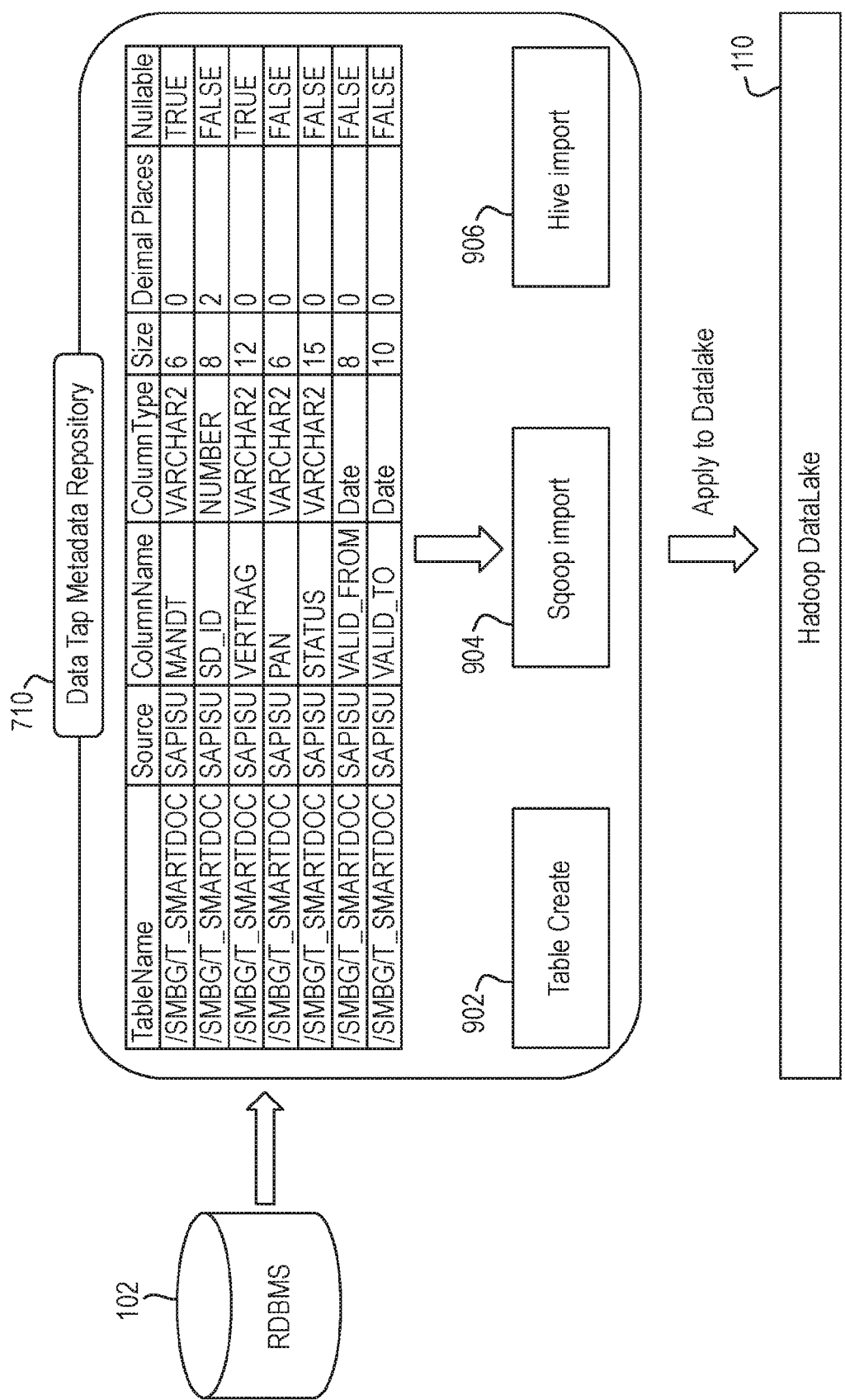
FIGS. 9A and 9B illustrate the use of automatically generated scripts for data import.
Figure 9B:
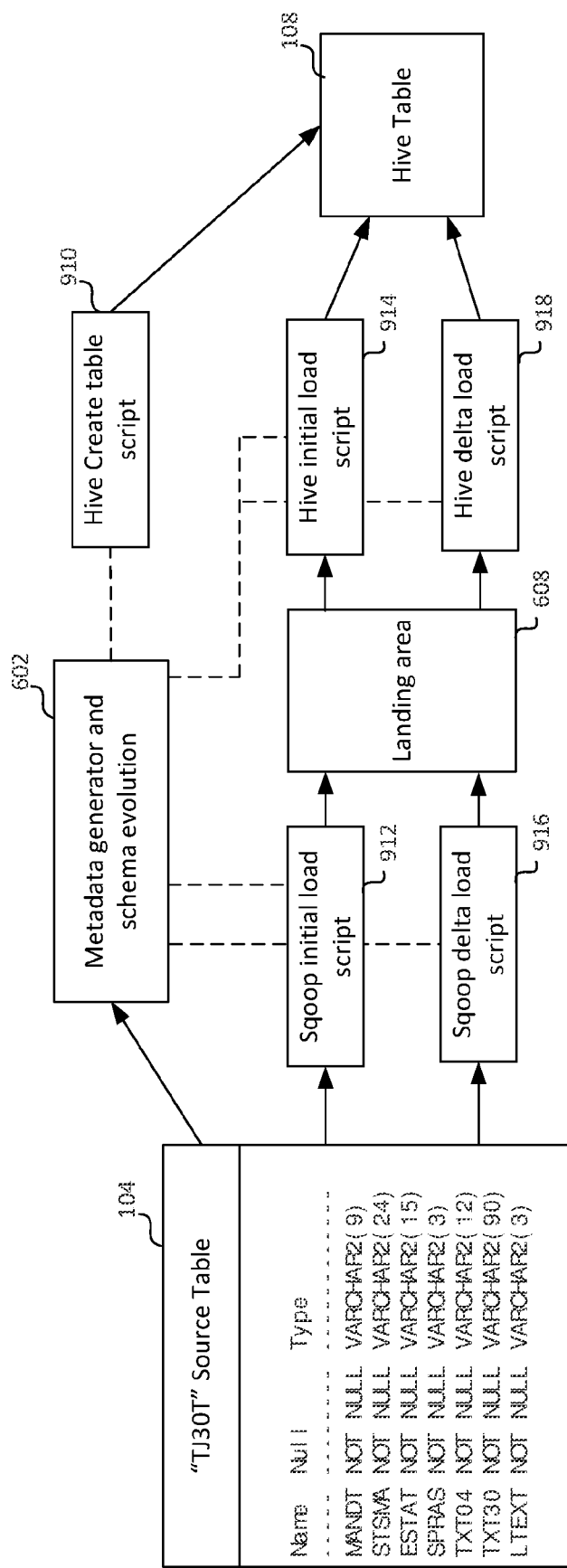

The generation and operation of import scripts is illustrated in further detail in FIGS. 9A and 9B.

FIG. 9A illustrates a set of metadata for a given source table from data source 102 in the metadata repository 710, which is used to generate various scripts, such as table creation 902, Sqoop import 904 and Hive import 906. The scripts are executed to apply schema changes and import data to the data lake 110.

FIG. 9B illustrates a more detailed example, in which a source table 104 with table name "TJ30T" and a set of fields MANDT, STSMA, ESTAT, SPRAS, TXT04, TXT30, and LTEXT is being imported.

The Metadata Generator and Schema Evolution module 602 reads the table schema metadata from the source and generates the following scripts (script generation is shown by the dashed lines in FIG. 9B):

- A HQL script 910 comprising one or more data definition language (DDL) statements for creating the Hive table 108 corresponding to source table 104 in the Hadoop data lake
- A Sqoop initial load script 912 for performing an initial load of the full data of the source table
- A Sqoop delta load script 916 for performing a subsequent delta load from the source table (i.e. for loading a set of differences since last import, e.g. in the form of inserted, updated, or deleted records)
- A Hive initial load script 914 for storing an initially loaded full table data set into the Hive table
- A Hive delta load script 918 for storing a table delta (i.e. a set of differences since last import, e.g. in the form of inserted, updated, or deleted records) into the Hive table After the initial run of the Metadata Generator/Schema Evolution module 602, the Hive create table script 910 is run to create the Hive table 108. Then, the Sqoop initial load script 912 is executed to read the full table contents of the table into landing area 608. After pre-processing (e.g. by the resequencing/cleansing process as described elsewhere herein), the Hive initial load script 914 is executed to store the data acquired by the Sqoop initial load script 912 into the Hive table 108.

For subsequent imports of the table (e.g. this may be done periodically, for example once a day), the Sqoop delta load script 916 is executed to acquire the table delta since last import which is stored in landing area 608. After pre-processing, the Hive delta load script 918 then applies the differences to the Hive table 108, e.g. by applying any necessary insert, update or delete operations. However, in some cases (e.g. if tables need to be regenerated/recovered due to inconsistency or after a failure), the initial load scripts could be run instead of the delta load scripts to import the full table contents into the Hadoop data lake.

The scripts thus together form part of an automated data import process, which is reconfigured dynamically in response to changes in the source data schema, by modification/regeneration of the various scripts as needed.

As previously mentioned, the system maintains templates for each RDBMS source type (e.g. Oracle, Mysql, MS-sql etc.) to enable Sqoop generation. As a result, importing additional tables from existing supported databases for which a template exists requires no development activity. To support new source database systems, additional templates can be added to the code to enable generation of initial and delta load Sqoop scripts.

Examples of scripts generated by the system are set out in the Appendix below (see e.g. Samples 1-3 provided there). An example of a Sqoop template is shown in Sample 6 of the Appendix.

If during a subsequent import the metadata generator/schema evolution module 602 identifies changes to the source schema that affect how data is read from the source database, then the Sqoop scripts 912, 916 are regenerated as needed. Furthermore, if the changes in the source necessitate changes to the Hive table structure, then the Hive scripts 914, 918 are also regenerated as needed, and the Hive table structure is adapted as required (e.g. by executing an "ALTER TABLE" statement or the like).

The following sections provide information on how different source schema changes may be handled.

Addition of a Column

As an example, a column may be added to the source table. Assume the table initially has the structure illustrated in FIG. 9B:

| Name | Null | Type |
|---|---|---|
| MANDT | NOT NULL | VARCHAR2(9) |
| STSMA | NOT NULL | VARCHAR2(24) |
| ESTAT | NOT NULL | VARCHAR2(15) |
| SPRAS | NOT NULL | VARCHAR2(3) |
| TXT04 | NOT NULL | VARCHAR2(12) |
| TXT30 | NOT NULL | VARCHAR2(90) |
| LTEXT | NOT NULL | VARCHAR2(3) |

Subsequently, the following column "COL1" is added to the table:

| Name | Null | Type |
|---|---|---|
| COL1 | NOT NULL | VARCHAR2(10) |

The system then creates an additional column in the Hive table (see e.g. code sample 4 in the Appendix below). Furthermore the Sqoop and Hive scripts are regenerated to reference the new column (see e.g. code sample 5 in the Appendix).

Deletion of a Column

Where a column in the source table schema is deleted, the scripts 912, 916, 914 and 918 are similarly regenerated to no longer reference the deleted column. While the column could then be deleted in the Hive table, in one embodiment, the column is retained but marked as no longer in use. This allows historical data to be retained and remain available for analysis/reporting, but future imported records will not contain the column in question.

Unique Index Change for Table

When one or more new key columns are added, the new key columns are moved to the left-most positions in the Hive schema, as this can be more efficient for map-reduce code to process (e.g. when performing delta calculations as described below), since such processing is typically based on processing source keys, and hence only the first few columns are frequently parsed and not the entire records. In some embodiments, this change may be performed manually though it could alternatively also be carried out automatically.

Other Changes

Preferred embodiments do not modify the Hive tables or import scripts based on changes in data type related information (e.g. changes of the data type of a table column, changes in column lengths, etc.) as all data has by default been converted and processed as character strings during import. However, if there was a requirement to retain data types, then the described approach could be changed to accommodate this and automatically detect and handle such changes, e.g. by implementing appropriate type conversions.

Difference Calculator

The present embodiments allow changes in source tables to be captured in two ways. Firstly, a change data capture solution can be implemented on the source system to capture change data. This could be implemented within the source database environment, to identify changes made to data tables and export those changes to the Data Tap import tool. However, in some cases, the complexity of such a solution may not be justified and/or the underlying data storage system (e.g. RDBMS) may not provide the necessary functionality.

Data Tap therefore provides a difference calculator tool to avoid the need for implementing such an expensive solution on the source system.

Some of the key features of the difference calculator include:

Scalable/Parallel Execution using Map Reduce Architecture

Automatically recognises the DML Type of Record

Provides framework to re-run on failure or re-commence from failure point

Automatic Creation of Hive Metadata for newly created partitions

Ease of use which minimises development time

The difference calculator can be used provided that the source data can be extracted in a suitable timeframe. It is therefore preferable to use this method for low to medium-sized data sets depending on the data availability requirements.

Generally, the decision on whether to use the difference calculator or a change data capture solution can be made based on the specific data volumes and performance requirements of a given application context. As an example, benchmarks run for a particular implementation have shown that to process 3 TB of data spread across approximately 600 tables will take approximately 6 hours (4 hours to pull data from Source into the lake, 2 hours to run through the Difference Calculator & History Capture Process). In a preferred embodiment, delta processing is performed at source if the table size exceeds 30 GB. This is not a hard limit, but is based on the impact of storage size and processing time on the Hadoop platform.

In one example, if performed at source in an Oracle database environment, then Oracle Golden Gate may be used to process the deltas, and Oracle's big data adapter may be used to stream these delta changes straight to the Hadoop file system where the changes are stored in a file. The system periodically takes a cut of the file, and then Hive Insert is used to update the Hive tables in Hadoop. In this scenario, Sqoop scripts may not be needed to import data from the source.

On the other hand, if the difference calculator is used (e.g. for tables smaller than 30 GB), then the whole table is copied periodically across to the Hadoop HDFS file system using a Sqoop script (e.g. script 912), and the difference calculator then runs on the copied table data.

In an embodiment, both Sqoop and Oracle's big data adapter have been configured to output their files in character string format to enable easier parsing. However, in alternative embodiments this could be changed, so that the native formats are passed across in both Sqoop and Oracle's big data adapter.

Figure 10A:
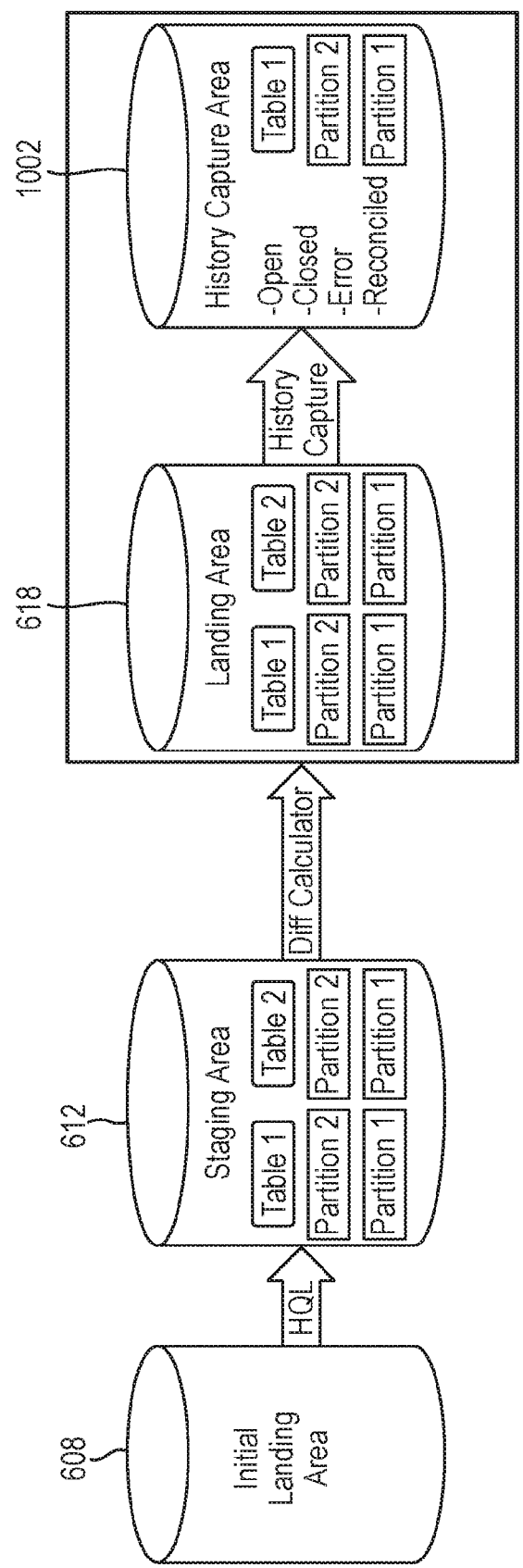
FIGS. 10A and 10B illustrate functional components of a table difference calculator.

The architecture of the difference calculator is illustrated in FIG. 10A.

Data is read from a table in the data source into an initial landing area 608 as previously described. Initial processing/cleansing is performed and the pre-processed data is stored in staging area 612. The difference calculator then compares the table data to a previous version of the table (e.g. a most recently imported version, a copy of which may be maintained by the system) and identifies any differences. The identified differences are saved to landing area 618 and provided as input to the history capture process 620 (see FIG. 6A).

Figure 10B:
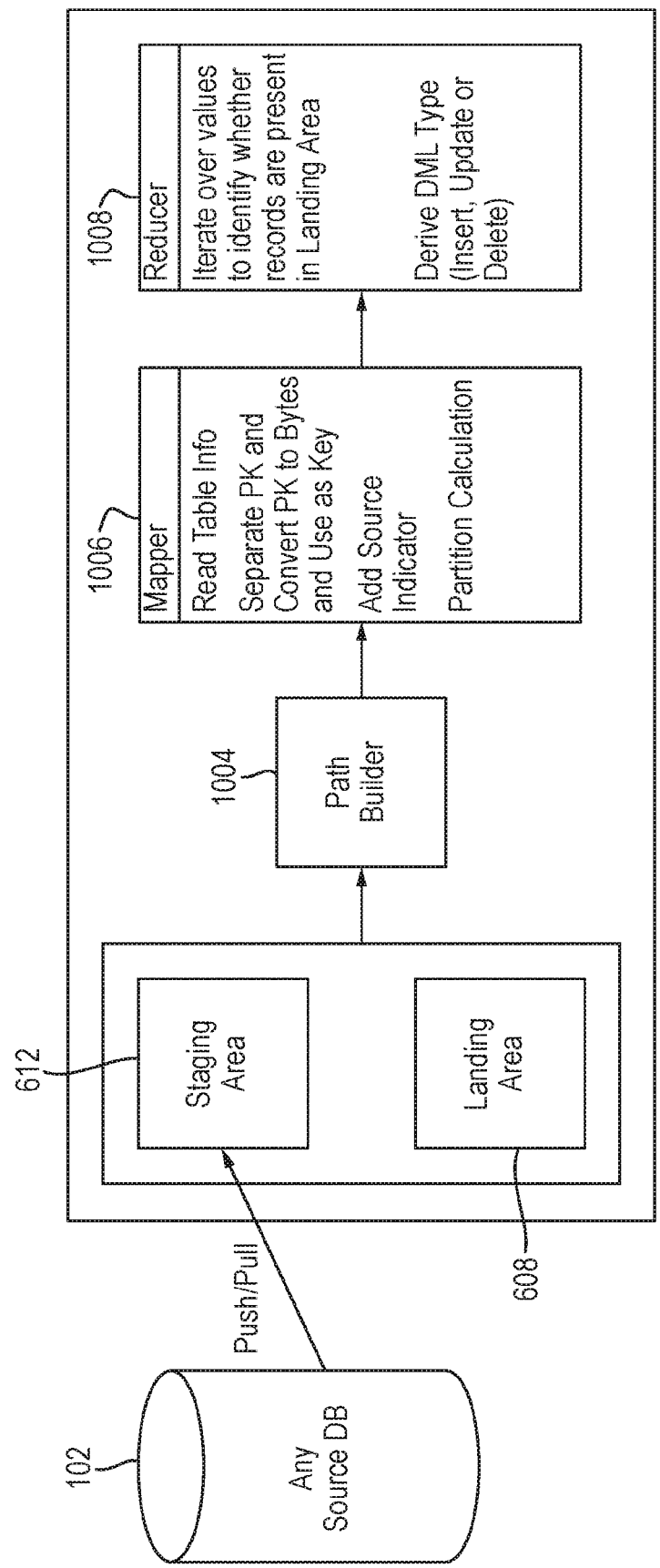

FIG. 10B illustrates the software architecture of the difference calculator process. Table data is read into the staging area 612 (via landing area and pre-processing if required as previously described) using a push or pull transfer model. The difference calculation is implemented in a parallelized fashion using a map-reduce algorithm. To support this, a "Path Builder" component 1004 may be provided which is used to construct the directory path names for use by the map-reduce code implementing the Difference Calculator and incorporates the data source and table names. Here, the mapper 1006 reads the table information and separates the source key and uses this as the data key for the map-reduce algorithm. A source indicator is added identifying data source 102, and a partition calculation is carried out. The reducer 1008 iterates over values to identify whether records are present in the landing area and identifies the change type (typically corresponding to the DML, data manipulation language, statement that caused the change). The change type is thus typically identified as one of Insert, Update or Delete. The change is stored e.g. with the record key, change type, and old/new values (if required).

Delta processing is performed on a row-by-row basis. The system maintains daily snapshots of the whole source tables (e.g. stored in the Hadoop data lake). Newly imported data is compared to the most recent previous snapshot of the table (corresponding to the time of the last run of the difference calculator) to produce a delta file for the table.

In one embodiment, the system maintains 15 days of old table snapshots on the Hadoop platform. This is one reason for the 30 GB limit employed in one embodiment, together with the time it takes to process the differences between two 30 GB tables. However, the specifics may vary depending on application context and available processing/storage resources.

Figure 11:
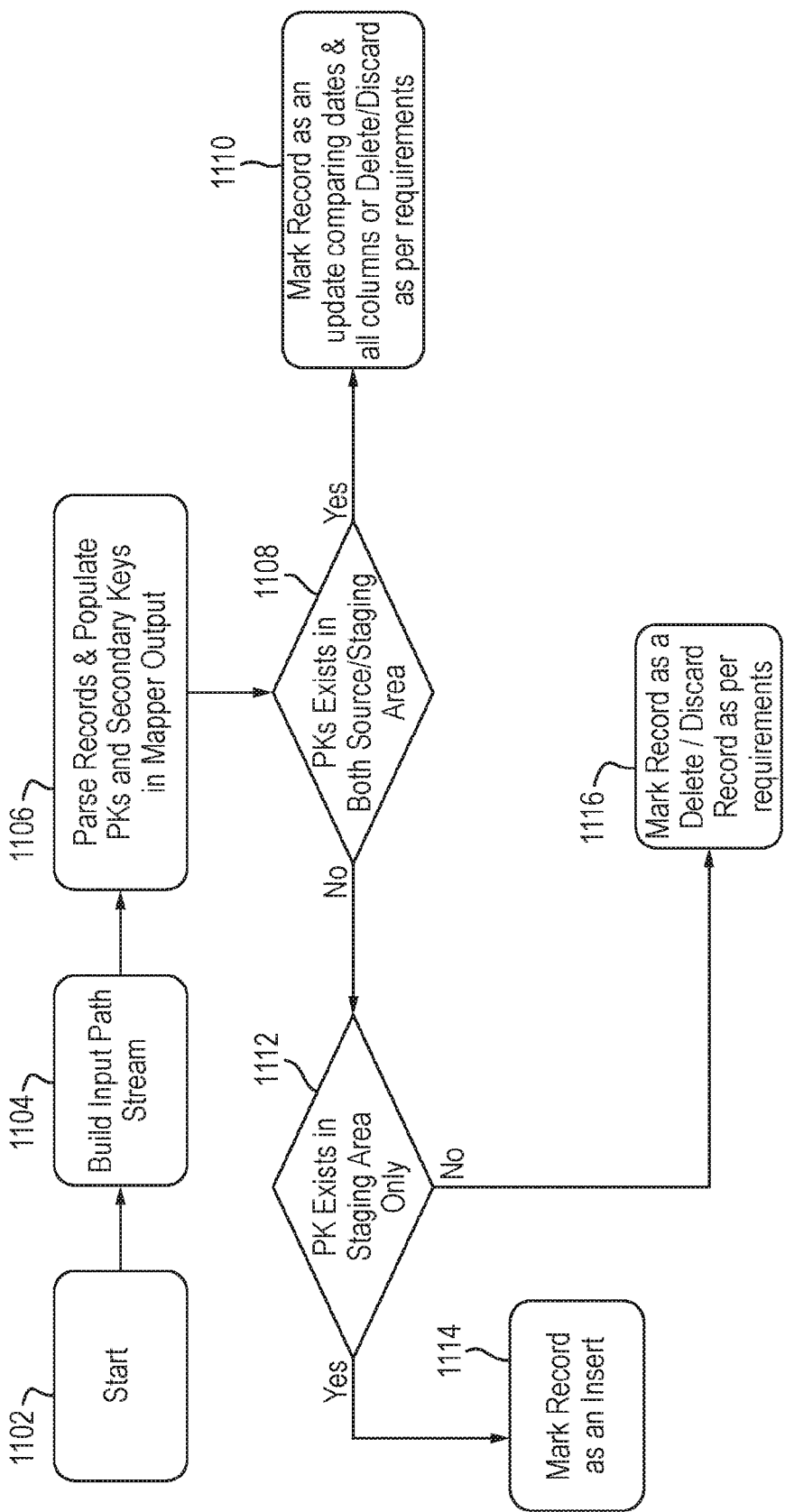
FIG. 11 illustrates the operation of the table difference calculator.

FIG. 11 is a flow chart illustrating the difference calculation process. The process begins at step 1102 after a table has been read into the staging area. In step 1104 an input path stream is built by the path builder component (in the form of a string containing the directory path name for use by the map-reduce code). In step 1106, records in the staging area are parsed and source key and target keys are populated in the mapper output (in an example, a time stamp added during import as part of the management information is used as a target key, with the difference calculator sorting the output by source key and then by the target key). In step 1108 the system checks whether a given source key exists in both the current version of the Hive table in the data lake (i.e. as stored in the OPEN database) and the staging area. If yes, then the imported version of the record is compared to the cached version (preferably comparing each column value) and is marked as an update in step 1110 if any differences are identified. If not, then step 1112 checks whether the source key exists in the staging area only (and not in the Hive table). If yes, then the record is a new record, and is marked as an Insert in step 1114. If not, then it follows that the record exists in the Hive table but not the staging area, and is therefore a deleted record. The Record is marked as deleted in step 1116.

Hive Insert is then used to insert the delta rows from the delta file into the Hive tables in Hadoop for any updates marked as "Insert". Similarly, Hive Update commands are used for any changes marked as "Update" to update the values in the Hive table, and Hive Delete commands are used to remove records marked as "Deleted".

Note that these changes occur in the OPEN database. As described elsewhere, the OPEN and CLOSED databases are re-created regularly (e.g. each day) by the History Capture process. Thus, rows which are deleted are no longer present in the OPEN database, but remain in the CLOSED database (with the additional time-stamp related columns updated to reflect the validity periods and reasons). There may be certain circumstances in which certain tables are not permitted to have their rows removed. In these cases the rows remain in the OPEN database but are marked as "Discarded" instead.

Figure 12:
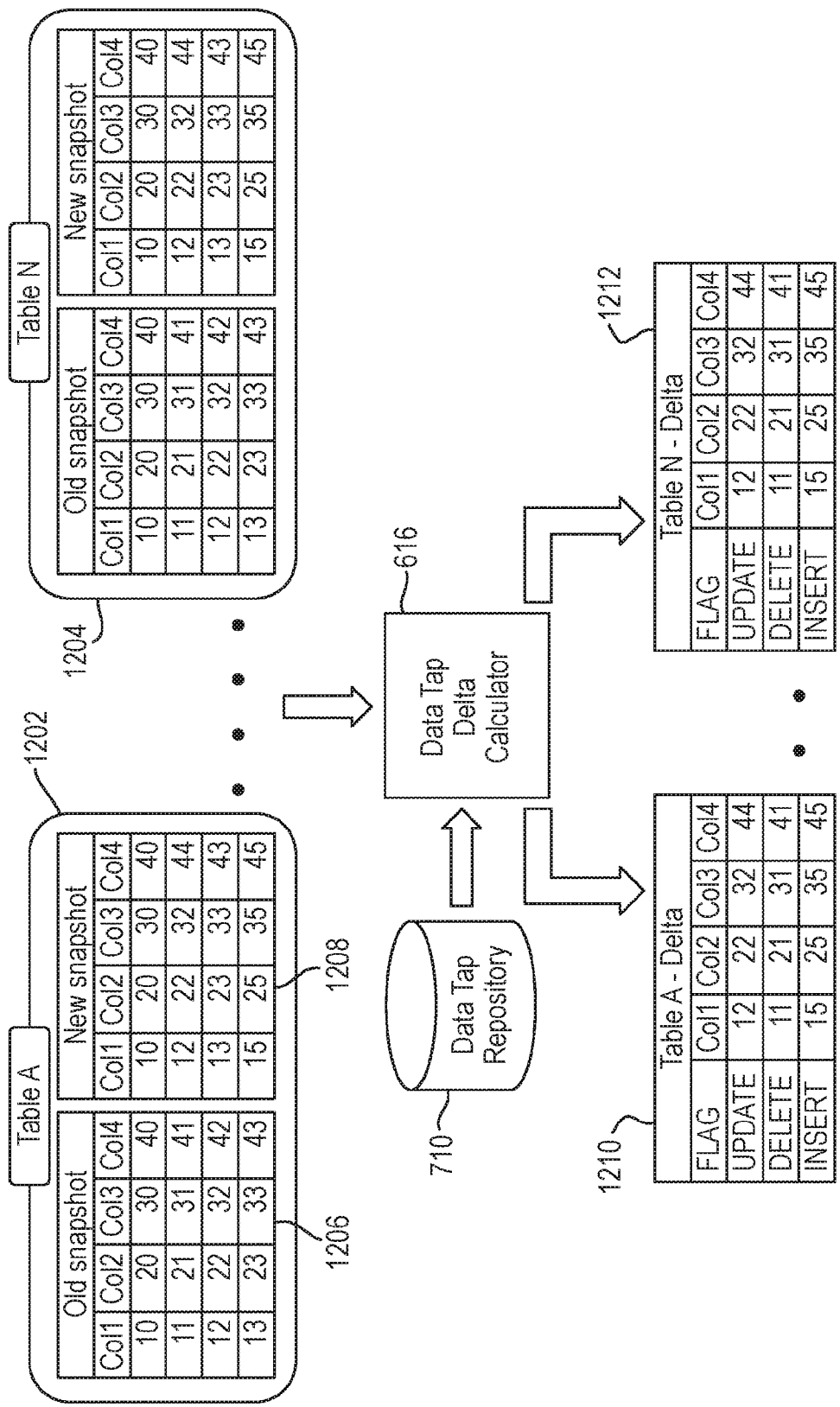
FIG. 12 illustrates an example of a table difference calculation.

FIG. 12 illustrates an example of the delta calculation. Here, a number of tables Table A (1202) to Table N (1204) are processed by the Delta Calculator 616. In each case, a source key column (or column combination) is used as the basis for identifying the differences between an old snapshot 1206 (previously imported from the data source) and a new snapshot 1208 (currently imported from the data source). In this example, column "coi1" may, for example, serve as the source key. The delta calculator identifies the difference between the old snapshot (with old column values) and the new snapshot (with new column values). Here, for Table A, the following differences are identified:

The record with col1=11 is no longer present in the new snapshot

The record with col1=12 has been modified in the new snapshot

The record with col1=15 is newly added in the new snapshot

Thus, entries are added to Table A Delta 1210 for each identified difference, with a flag indicating the update type (UPDATE/DELETE/INSERT) and the new column values (for UPDATE and INSERT entries) or the old column values (for DELETE entries). Similar deltas are generated for the remaining tables (e.g. delta 1212 for Table N).

The generated table deltas including flags and column values are then used to update the corresponding Hive tables (e.g. via the previously generated Hive delta import scripts).

As previously indicated, the delta calculation process is preferably implemented as a distributed map-reduce algorithm (e.g. running across the Hadoop cluster), making it highly scalable and allowing deltas for multiple tables to be calculated in parallel. The process is configurable and meta-data driven (using the metadata stored in the metadata repository 710).

History Capture

Generally, after the initial import from a new data source has occurred (via the initial load scripts) and the relevant structures have been created in the data lake for the imported data, subsequent updates are performed incrementally (using the delta load scripts and difference calculator as needed), to capture changes in the data sources and apply those changes to the data lake (see FIG. 9B). In some embodiments, such updates could occur on an ad hoc basis (e.g. in response to operator command) or on a scheduled basis. In the latter case, the update schedule could differ for each data source.

However, in a preferred embodiment, for efficiency and to ensure a degree of data consistency, a coordinated approach is adopted, in which all data sources are updated on a periodic basis. In this approach, delta load is performed on a periodic basis, e.g. daily, from each of the imported data sources, and the OPEN and CLOSED databases are updated accordingly. This periodic update is coordinated by the History Capture process.

History Capture is a process which is run intermittently, preferably on a regular basis (e.g. daily, for example every midnight) to create the snapshot of the current stable data in the data lake.

In an embodiment, the History Capture process is implemented as a Java map-reduce program which is used to update the two main operational databases, namely OPEN and CLOSED. The process uses the output from daily delta processing (e.g. from the Data Tap Difference Calculator as described above, or from table deltas provided by the source databases e.g. via the Oracle Golden Gate/Oracle Data Integrator feed). It then determines which rows should be inserted, updated, or deleted, and creates a new set of database files each day for both the OPEN and CLOSED databases. As part of this process every table row is time-stamped with five additional columns of management information, namely:

jrn_date—time-stamp from the source system database (for Oracle Data Integrator feeds this is from the source system journal database, for DataTap feeds this is when the Sqoop import script is run to copy the source system database)

jrn_flag—indicator whether the record is an: INSERT, UPDATE, or DELETE tech_start_date—time-stamp when this row is valid from, i.e. when History Capture has inserted or updated this new record.

tech_end_date—time-stamp when this row is valid until, i.e. when History Capture has updated (overwritten), deleted, or discarded this old record. In the OPEN database all rows are set to a high-date of 31/12/9999.

tech_closure_flag—reason this old record has been removed: UPDATE, DELETE, DISCARD.

In a preferred embodiment, neither of the actual databases (OPEN and CLOSED) are updated, rather the Java M/R will re-create a new version of the database files for both the OPEN and CLOSED tables, each with the five time-stamp related columns updated to reflect validity periods of the rows.

The "tech_start_date" and "tech_end_date" columns effectively describe the dates and times between which a particular row is current. These dates are used to ensure the current version received from the source system is stored in the OPEN database holding the current view of the data. When any updates/overwrites or deletes are detected as part of the history capture process, old rows are removed from the OPEN database and added to the CLOSED database with the appropriate time stamp.

Thus, after the delta import and History Capture processes are complete, an updated OPEN database will hold a currently valid data set comprising data from the various imported data sources, while the CLOSED database will hold historical data.

By way of the described processes, changes made in the source database automatically propagate through to the data lake. This applies both to changes of data contained in a given table, as well as changes in the data schema.

For example, if a column was added to a table in a data source, only records since the addition may have a value for that column in the data source, with other records holding a "null" value for that column. Alternatively, values may have been added for the column for pre-existing records. In either case, the null or new values will propagate to the OPEN database in the data lake (which will have been suitably modified to include the new column). The latest version of the source data tables is then available in the OPEN database, and any previous version is moved to the CLOSED database. The CLOSED database will retain all data lake history including what the tables looked like before the changes made on a particular date.

Note that in some cases source databases may already include history information (e.g. by way of date information held in the source tables). Such application-specific history information is independent of the history information captured by the History Capture process and will be treated by the system (including Data Tap) like any other source data.

Such information would thus be available to consumers in the data lake from the OPEN Database in the normal way.

The History Capture process responds to deletion, overwriting or updating of any information in the source (regardless of whether the information corresponded to historical data in the source), by moving the old version to the CLOSED database with timestamps applied accordingly.

Interactions Between Data Replication System and Data Tap

The data replication and Data Tap components of the system may work together synergistically to further enhance the functionality of the system.

In a first example, referring back to FIG. 1, the source repository 110 may store a data supporting operations system 116, some of which may be periodically updated from an external database 102. Each run of the Data Tap module (e.g. on a daily basis) may result in changes to the data in the repository 110—for example additions/updates/deletions. These are then automatically replicated to the target repository 130 by replication system 120. Any changes to the data model of the source database 102 (e.g. addition of a table column) may also be captured by Data Tap with corresponding modifications made to Hive tables 108. The replication system replicates these types of changes as well, thus allowing the target repository to remain synchronized both in data content and data model.

Similarly, a new source table could be imported into the source repository by Data Tap, and at the same time a configuration option could state that the table should be replicated from the source repository to one or more target repositories (e.g. with different configured replication delays).

In a further example, the data replication system and Data Tap components may rely on a shared metadata repository defining the data model of the stored data. This metadata repository may be updated by Data Tap as it imports source data into repository 110 and then used by the data replication system to carry out replication.

It will be understood that the present invention has been described above purely by way of example, and modification of detail can be made within the scope of the invention.

APPENDIX—SCRIPT SAMPLES

SAMPLE 1: The following is a sample Sqoop script for performing an initial load for the "TJ30T" source table 104 as depicted in FIG. 9B:

```
source $1
sqoop import -D oraoop.jdbc.url.verbatim=true -D
mapred.job.queue.name=${queueName} -D
mapred.job.name=TJ30T_SQOOP_INITIAL_LOAD -
Djava.security.egd=file:/dev/../dev/urandom -D mapred.child.java.opts="-
Djava.security.egd=file:/dev/../dev/urandom" --direct --connect
jdbc:oracle:thin:@//${host_name}:${port_number}/${db_instance} --username
${username} --password "${password}" --num-mappers ${sqoopMappers} --hive-
import --hive-overwrite --hive-delims-replacement " --null-string " --null-non-string
" --table sourcedb. "TJ30T" --target-dir
/user/hdp_batch/sourcedb//initial/crm/crm_tj30t --map-column-hive
MANDT=STRING,STSMA=STRING,ESTAT=STRING,SPRAS=STRING,TXT04=
STRING,TXT30=STRING,LTEXT=STRING --hive-table
prod_landing_initial_area.crm_tj30t
```

SAMPLE 2: The following is a sample HQL script for creating a Hive table in the data lake corresponding to the FIG. 9B table:

```
USE ${hivevar:DATABASE};
CREATE ${hivevar:EXTERNAL} TABLE IF NOT EXISTS
crm_tj30t${hivevar:LABEL} (
${hivevar:ERRORS}
  jrn_date STRING COMMENT '',
  jrn_flag STRING COMMENT '',
  tech_closure_flag STRING COMMENT 'Utility filed for closure flag',
  tech_start_date STRING COMMENT '',
  tech_end_date STRING COMMENT '',
  mandt STRING COMMENT '',
  stsma STRING COMMENT '',
  estat STRING COMMENT '',
  spras STRING COMMENT '',
  txt04 STRING COMMENT '',
  txt30 STRING COMMENT '',
  ltext STRING COMMENT ''
) COMMENT ''
PARTITIONED BY (tech_datestamp STRING COMMENT 'YYYY-MM-DD on
which partition was created', tech_type STRING COMMENT 'OPEN, DELTA,
CLOSED', tech_num STRING COMMENT 'ops partition, sequence number of
the load')
ROW FORMAT DELIMITED
FIELDS TERMINATED BY '\001'
```

```
STORED AS SEQUENCEFILE TBLPROPERTIES(
    "mapreduce.output.fileoutputformat.compress"="true",
    "mapreduce.output.fileoutputformat.compress.type"="BLOCK",
    "mapreduce.output.fileoutputformat.compress.codec"="org.apache.hadoo
p.io.compress.GzipCodec"
);
```

SAMPLE 3: The following is a sample HQL script for performing an initial load of the Hive table:

```
USE ${hivevar: DATABASE};
SET mapred.job.queue.name=${hivevar:QUEUE_NAME};
SET hive.merge.size.pertask=100000000;
SET hive.merge.smallfiles.avgsize=100000000;
SET hive.exec.parallel=true;
SET hive.exec.parallel.thread.number=50;
SET hive.exec.compress.output=true;
SET
mapred.output.compression.codec=org.apache.hadoop.io.compress.GzipCodec;
SET mapred.output.compression.type=BLOCK;
INSERT INTO TABLE crm_tj30t PARTITION
(tech_datestamp='${hivevar:DATESTAMP}', tech_type='ORIGINAL',
tech_num='${hivevar:NUM}') SELECT '${hivevar:DATESTAMP}00:00:00.0' as
jrn_date, 'ORIGINAL' as jrn_flag, NULL as tech_closure_flag, NULL as
tech_start_date, NULL as tech_end_date, mandt, stsma, estat, spras, txt04,
txt30, ltext FROM ${hivevar:INITIAL_DB}.crm_tj30t;
```

Corresponding Sqoop and Hive scripts for performing subsequent delta loads would also be provided.

SAMPLE 4: The following is a sample HQL script for modifying a table definition to add a column:

```
USE ${hivevar: DATABASE};
ALTER TABLE crm_tj30t ADD COLUMN (COL1 STRING);
```

SAMPLE 5: The following is a sample updated Sqoop script for importing the modified table (initial load; a corresponding modified delta load script would also be generated):

```
source $1
sqoop import -D oraoop.jdbc.url.verbatim=true -D
mapred.job.queue.name=${queueName}-D
mapred.job.name=TJ30T_SQOOP_INITIAL_LOAD -
Djava.security.egd=file:/dev/../dev/urandom -D mapred.child.java.opts="-
Djava.security.egd=file:/dev/../dev/urandom" --direct --connect
jdbc:oracle:thin:@//${host_name}:${port_number}/${db_instance} --username
${username} --password "${password}" --num-mappers ${sqoopMappers} --hive-
import --hive-overwrite --hive-delims-replacement " --null-string " --null-non-string
" --table SAPCRM."TJ30T" --target-dir
/user/hdp_batch/sapcrm//initial/crm/crm_tj30t --map-column-hive
MANDT=STRING,STSMA=STRING,ESTAT=STRING,SPRAS=STRING,TXT04=
STRING,TXT30=STRING,LTEXT=STRING, COL1=STRING --hive-table
prod_landing_initial_area.crm_tj30t
```

Corresponding modified HQL initial/delta load scripts could also be generated as needed.

SAMPLE 6: The following is a sample Sqoop template.

```
"sqoop import -D
mapred.job.name=${sqoop table name} SQ00P_INITIAL_LOAD -D
mapred.job.queue.name=${queueName} "
    + "-Djava.security.egd=file:/dev/../dev/urandom "
    + "-D mapred.child.java.opts=\"\\-Djava.security.egd=${sqoopSecurityFile}\" "
    + "--connect jdbc:oracle:thin:@//${sqoopSourceServer}/${sqoopSchema}"
    + "--username ${sqoopUsername} --password \"${sqoopPassword}\" "
```

```
+ "--num-mappers ${numOfMappers} --hive-import --hive-overwrite --hive-drop-
import-delims "
+ "--null-string " --null-non-string " "
+ "--query 'SELECT ROW_NUMBER, ${sqoop col str tmp} FROM ( select
${ora hash str}${sqoop col str tmp} "
+ "FROM ( select ${sqoop col str) FROM
${schemaName}.\"${sqoop table name}\")) "
+ "WHERE $CONDITIONS' "
+ "--target-dir ${sqoopTargetDir}/initial/${sourceSystem}/${hive table name}
"
+ "--split-by ROW_NUMBER --map-column-hive ${hive col str} "
+ "--hive-table ${tempLandinqArea}.${hive table name}"
```

The template includes an invocation of the Sqoop tool with relevant parameters, including an embedded database query (here SQL) for retrieving the required data from the source database. The template includes placeholder variables of the format ${variable_name}. These placeholder variables are substituted during script generation with the applicable values. For example, ${sqoop_table_name} is substituted by the relevant table name and ${sqoop_col_str_tmp} is substituted with the list of columns being imported. Hive templates may be constructed in an analogous fashion.

The invention claimed is:

1. A method of replicating changes made to a source data repository at a target data repository, the method comprising:
   detecting a data change event at the source data repository, the data change event comprising insertion or update of one or more rows in a database table;
   sending a change event message from the source data repository to the target data repository, wherein the change event message includes row identifiers of the inserted or updated rows but does not include other row data of the inserted or updated rows;
   in response to receipt of the change event message from the source data repository, sending a request from the target repository to the source data repository to retrieve the row data of the inserted or updated rows, the request including the row identifiers;
   retrieving, by the source data repository in response to the request, the requested row data and transmitting the requested row data to the target data repository;
   receiving the requested row data from the source data repository at the target data repository; and
   updating data stored in the target data repository based on the received row data;
   wherein the change event message is received at the target data repository via a messaging service, the method comprising subscribing, by the target data repository, to change event messages from the messaging service.

2. A method according to claim 1, wherein the message specifies an operation performed at the source data repository, the operation comprising one of an insert or update operation.

3. A method according to claim 1, comprising sending the change event message to the messaging service.

4. A method according to claim 1, wherein detecting the change event comprises inspecting a change log associated with the source data repository.

5. A method according to claim 1, wherein the updating step comprises modifying data at the target repository to replicate the change event at the target repository.

6. A method according to claim 1, wherein transmitting the row data comprises transmitting a file comprising the row data from the source data repository to the target data repository.

7. A method according to claim 1, wherein the data change event comprises creation or modification of a file at the source repository, and wherein the receiving step comprises receiving a copy of the created or modified file from the source repository.

8. A method according to claim 1, wherein transmitting the requested row data comprises transmitting a copy of one or more files storing the inserted or updated rows of the database table.

9. A method according to claim 1, wherein the source and/or target data repository comprise(s) at least one of: an unstructured or flexibly structured data repository; and a distributed data storage cluster.

10. A method according to claim 9, wherein the unstructured or flexibly structured data repository comprises a data warehouse or a data lake, and the distributed data storage cluster is based on Apache Hadoop and/or Apache Hive.

11. A method according to claim 1, comprising replicating at least one of: a Hive metadata change, wherein the change event message relates to creation of a Hive table or modification of a Hive table definition, the updating step comprising applying a corresponding change to data structures at the target data repository; and a Hive table data change, wherein the change event message relates to insertion, deletion or update of one or more rows in a Hive table, the updating step comprising applying a corresponding change to a Hive table in the target repository based on the received data values.

12. A data replication system comprising a source data repository, a target data repository and a messaging server, and further comprising:
   software code for providing a change event detection subsystem and configured to run at the source data repository;
   software code for providing a change event implementation subsystem and configured to run at the target data repository; and
   software code configured to run at the messaging server for providing a messaging service configured to transmit received messages in accordance with message subscriptions;
   wherein the change event detection subsystem is configured to detect changes made to the source data repository and transmit change event messages to the messaging service; and
   wherein the change event implementation subsystem is configured to:
   subscribe to change event messages at the messaging service; and in response to receipt of a change event message, to implement the change event at the target data repository;

wherein the change event implementation subsystem is adapted to:

receive a change event message from the source data repository comprising information relating to a data change event detected at the source data repository, the data change event comprising insertion or update of one or more rows in a database table, wherein the change event message includes row identifiers of the inserted or updated rows but does not include other row data of the inserted or updated rows;

in response to receipt of the change event message from the source data repository, send a request from the target repository to the source data repository to retrieve the row data of the inserted or updated rows, the request including the row identifiers;

receive the requested row data from the source data repository; and update data stored in the target data repository based on the received row data.

13. A data replication system according to claim 12, comprising at least one of:

a plurality of target data repositories each comprising respective change event implementation subsystems, each change event implementation subsystem adapted to subscribe to change event messages from the source data repository and implement corresponding change events at the respective target data repository; and a plurality of source data repositories each comprising a respective change event detection subsystem adapted to transmit change event messages to the messaging service corresponding to change events at the respective source data repository.

14. A data replication system according to claim 13, wherein change event messages from the plurality of source data repositories are forwarded by the messaging service to at least one target data repository for replication of the change events at the at least one target data repository.

15. A data replication system according to claim 12, wherein the change event implementation subsystem is configured to filter received messages and/or replicate a selected subset of change events at the target repository.

16. A non-transitory computer readable medium comprising software code configured, when executed on a data processing apparatus, to perform a method of replicating changes made to a source data repository at a target data repository, the method comprising, at the target data repository:

receiving a change event message from the source data repository comprising information relating to a data change event detected at the source data repository, the data change event comprising insertion or update of one or more rows in a database table, wherein the change event message includes row identifiers of the inserted or updated rows but does not include other row data of the inserted or updated rows;

in response to receipt of the change event message from the source data repository, sending a request from the target repository to the source data repository to retrieve the row data of the inserted or updated rows, the request including the row identifiers;

receiving the requested row data from the source data repository; and updating data stored in the target data repository based on the received row data;

wherein the change event message is received at the target data repository via a messaging service, the method comprising subscribing, by the target data repository, to change event messages from the messaging service.

17. A method according to claim 8, wherein the source data repository stores the database table in a plurality of files, each file corresponding to a partition of the database table comprising a respective subset of the rows of the database table, and wherein the step of transmitting the requested row data comprises transmitting only one or more of said files containing the inserted or updated rows.

* * * * *